United States Patent
Im et al.

(10) Patent No.: US 10,545,571 B2
(45) Date of Patent: Jan. 28, 2020

(54) HEAD MOUNTED DISPLAY

(71) Applicant: LG ELECTRONICS INC., Seoul (KR)

(72) Inventors: Soungmin Im, Seoul (KR); Taehoon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/579,191

(22) PCT Filed: Jun. 8, 2015

(86) PCT No.: PCT/KR2015/005726
§ 371 (c)(1),
(2) Date: Dec. 1, 2017

(87) PCT Pub. No.: WO2016/195146
PCT Pub. Date: Dec. 8, 2016

(65) Prior Publication Data
US 2018/0136718 A1    May 17, 2018

(30) Foreign Application Priority Data
Jun. 2, 2015  (KR) .......................... 10-2015-0078080

(51) Int. Cl.
*G06F 3/01* (2006.01)
*G06T 7/73* (2017.01)
*G09G 5/377* (2006.01)

(52) U.S. Cl.
CPC .............. *G06F 3/012* (2013.01); *G06F 3/017* (2013.01); *G06T 7/73* (2017.01); *G09G 5/377* (2013.01);
(Continued)

(58) Field of Classification Search
CPC ........... G06T 7/73; G06T 19/006; G06T 7/20; G06T 7/70; G06T 7/74;
(Continued)

(56) References Cited

U.S. PATENT DOCUMENTS

| | | | |
|---|---|---|---|
| 2013/0163090 A1 | 6/2013 | Yu | |
| 2015/0094142 A1* | 4/2015 | Stafford | ............. G06F 3/04815 463/31 |
| 2016/0313790 A1* | 10/2016 | Clement | ................. G06F 3/011 |

FOREIGN PATENT DOCUMENTS

| | | |
|---|---|---|
| JP | 2013-117608 | 6/2013 |
| KR | 10-2005-0082348 | 8/2005 |

(Continued)

OTHER PUBLICATIONS

PCT International Application No. PCT/KR2015/005726, International Search Report dated Mar. 31, 2016, 2 pages.
(Continued)

*Primary Examiner* — Xiao M Wu
*Assistant Examiner* — Scott E Sonners
(74) *Attorney, Agent, or Firm* — Lee, Hong, Degerman, Kang & Waimey

(57) ABSTRACT

A head mounted display (HMD) according to the present invention is capable of controlling various functions on the basis of movement of a main body thereof. In addition, in order to control the various functions, the HMD can set a moving area where the main body is to be moved, and display alert information when the main body deviates from the moving area. More specifically, an HMD according to one embodiment of the present invention comprises: a main body configured to be worn on a user's head; a display unit, installed on one area of the main body, for outputting display screen information; and a control unit for controlling the display unit in a way that, in a taken image including an image of a preset object, the screen information is changed
(Continued)

on the basis of detection of a deformation in the image, wherein the control unit controls the display unit in a way that, if at least one portion of the image is not detected in the taken image, alert information related to the movement of the main body is displayed together on the screen information.

10 Claims, 17 Drawing Sheets

(52) U.S. Cl.
CPC ......... *G06F 3/013* (2013.01); *G09G 2340/12* (2013.01); *G09G 2354/00* (2013.01); *G09G 2370/16* (2013.01)

(58) Field of Classification Search
CPC ......... G06T 2207/30204; G06T 7/0014; G06T 7/248; G06T 7/593; G06T 3/20; G06T 7/00; G06T 7/33; G09G 2354/00; G09G 5/003; G09G 2340/14; G09G 2340/04; G02B 27/0172; G02B 2027/0138; G02B 2027/014; G02B 27/017; G02B 2027/0141; G02B 2027/0187; G02B 27/0176; G02B 27/0093; G06F 3/012; A63F 13/25; A63F 13/213; A63F 13/5258; A63F 2300/8082
See application file for complete search history.

(56) References Cited

FOREIGN PATENT DOCUMENTS

| | | |
|---|---|---|
| KR | 10-1492813 | 2/2015 |
| KR | 10-2015-0034449 | 4/2015 |

OTHER PUBLICATIONS

Korean Intellectual Property Office Application No. 10-2015-0078080, Office Action dated Mar. 24, 2016, 5 pages.
Korean Intellectual Property Office Application No. 10-2015-0078080, Notice of Allowance dated Jan. 11, 2017, 2 pages.

* cited by examiner

HEAD MOUNTED DISPLAY

CROSS-REFERENCE TO RELATED APPLICATIONS

This application is the National Stage filing under 35 U.S.C. 371 of International Application No. PCT/KR2015/005726, filed on Jun. 8, 2015, which claims the benefit of earlier filing date and right of priority to Korean Application No. 10-2015-0078080, filed on Jun. 2, 2015, the contents of which are all hereby incorporated by reference herein in their entirety.

TECHNICAL FIELD

The present invention relates to a head mounted display (hereinafter, referred to as 'HMD') capable of controlling functions by a movement of a main body.

BACKGROUND ART

A head-mounted display (HMD) refers to various image display devices such as glasses that are worn on a user's head to allow the user to view images (contents). Various wearable computers have been developed depending on the trend of weight reduction and size reduction of digital devices, and the HMD is also widely used. The HMD may be combined with an augmented reality technology, an N-screen technology, etc., beyond a simple display function, to provide various conveniences to the user.

Recently, with the increase in the use of the HMD, methods of performing various functions according to a posture of the HMD are being actively developed. Here, the posture of the HMD is a concept including a placed state of the HMD (a worn state on the user's head), a tilted degree of the HMD, a direction that the HMD faces, a position of the HMD, a rotation of the HMD, a movement of the HMD, and the like.

In the related art, an inclination or a movement of the HMD has been detected by using sensors mounted on the HMD or the like, and the posture of the HMD has been determined based on the detected result. However, in such a method, it is difficult to detect the movement of the HMD when the HMD moves in a horizontal direction without being tilted (for example, when the HMD moves in parallel to front, rear, right and left without being tilted).

Accordingly, when a taken (captured) image of a specific subject is changed according to the movement (motion) of the main body, a method of analyzing the image change of the specific subject included in the taken image to recognize the movement of the main body may be implemented. This method may enable a determination of even a movement of the HMD in a horizontal direction without being tilted as well as a tilted movement of the HMD. Accordingly, various functions can be more effectively controlled according to the movement of the main body.

However, this method fails to precisely recognize the movement of the main body when the specific subject is not located within a specific viewing angle range (or a specific range of field of view) any more due to the movement of the main body, which results from particularity that a camera forming the taken image is capable of capturing only the specific viewing angle range.

DISCLOSURE OF THE INVENTION

Accordingly, an aspect of the present invention is to provide a head mounted display (HMD), capable of outputting alert information notifying a situation that a preset object for analyzing a movement of a main body is out of a viewing angle range of a camera due to the movement of the main body, and a method of controlling the same.

To achieve these and other advantages and in accordance with the purpose of this specification, as embodied and broadly described herein, there is provided a head mounted display, including a main body formed to be wearable on a head portion of a user, a display unit mounted on one area of the main body and configured to output screen information, and a controller configured to control the display unit to change the screen information based on a detection of deformation of an image of the preset object in a captured image including the image of the preset object, wherein the controller controls the display unit so that alert information related to the movement of the main body is output together with the screen information when at least part of the image is not detected in the captured image.

In one embodiment, the head mounted display may further include a camera mounted on the main body. The preset object may be disposed outside the HMD, and the controller may acquire the captured image including the image of the preset object from the camera.

In one embodiment, the head mounted display may further include a wireless communication unit, and the preset object may be mounted on at least part of the main body. The controller may control the wireless communication unit to receive the captured image including the image of the preset object from a camera located outside the HMD.

In one embodiment, the preset object may be a plurality of light emitting elements each emitting preset light.

In one embodiment, the controller may control the display unit to change an output of the alert information based on a moving speed of the main body determined from the captured image.

In one embodiment, the controller may determine the moving speed of the main body using a degree of change of at least part of the image for a preset reference time when the at least part of the image is not detected in the captured image.

In one embodiment, the controller may control the display unit such that the alert information overlaps the screen information to correspond to a first degree of change when the degree of change of the at least part of the image is the first degree of change, and control the display unit to display recommendation information for another function, different from a function corresponding to the screen information, on the alert information when an overlap rate of the alert information with the screen information corresponds to a preset specific rate.

In one embodiment, the controller may execute the another function included in the recommendation information when the entire image is not detected in the captured image in a state where the recommendation information for the another function is displayed on the alert information.

In one embodiment, the controller may terminate an execution of the function corresponding to the screen information when the another function is executed, and control the display unit to output an execution screen according to the execution of the another function.

In one embodiment, the head mounted display may further include a sensing unit configured to sense a preset gesture. The controller may execute the another function while maintaining the execution of the function corresponding to the screen information when the preset gesture is detected by the sensing unit in a state where the recommendation information is output, and control the display unit to output an execution screen according to the execution of the another function together with the screen information.

In one embodiment, the head mounted display may further a sensing unit configured to sense a preset gesture. The controller may execute the another function included in the recommendation information when the preset gesture is detected by the sensing unit in a state where the recommendation information is displayed, and control the display unit to change the screen information to the execution screen according to the execution of the another function.

In one embodiment, the controller may control the display unit to change the execution screen according to the execution of the another function back to the screen information when the entire image is detected in the captured image in a state where the screen information has changed to the execution screen according to the execution of the another function.

In one embodiment, when the degree of change of the at least part of the image is a second degree of change, the controller may control the display unit so that the alert information includes information indicating that the main body is out of a moving area of the main body in which the main body is allowed to control the screen information.

In one embodiment, when a specific part of the image is not detected in the captured image, the controller may control the display unit to output the alert information at a position, which corresponds to a position of the specific part with respect to the image on the display unit.

In one embodiment, when a movement of a specific subject with respect to the main body is detected from the captured image and at least part of the image is not detected based on the movement of the specific subject, the controller may control the display unit such that the alert information includes notification information indicating presence of the specific subject.

To achieve these and other advantages and in accordance with the purpose of this specification, as embodied and broadly described herein, there is provided a method for controlling a head mounted display (HMD), the method including outputting screen information on a display unit mounted on one area of a main body, detecting a deformation of an image of a preset object in a captured image including the image of the preset object, changing the screen information based on the detection of the deformation of the image, and outputting alert information related to a movement of the main body together with the screen information when at least part of the image is not detected in the captured image.

In one embodiment, the preset object may be disposed outside the HMD, and the captured image including the image of the preset object may be acquired from a camera mounted on the main body.

In one embodiment, the preset object may be mounted on at least part of the main body, and the captured image including the image of the preset object may be received from a camera located outside the HMD through a wireless communication unit performing wireless communication with the camera.

In one embodiment, the alert information may be differently displayed based on a degree of change of the at least part of the image for a preset reference time when the at least part of the image is not detected in the captured image.

EFFECTS OF THE INVENTION

According to the present invention, a movement of a main body of a head mounted display (HMD) can be recognized by using a captured image with respect to a preset object, thereby accurately detecting various movements of the main body, and controlling various functions using the detected movements.

In addition, alert information can be output when capturing of at least part of the preset object is failed due to the movement of the main body, which may allow the user to recognize a moved state of the main body.

BEST MODE OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The HMD described in this specification may include a wearable device (e.g., a smart glass) and the like.

However, it will be easily understood by those skilled in the art that the configuration according to the embodiments described herein, unless otherwise limited to a case of being applicable only to the HMD, may be applied to mobile terminals, such as mobile phones, smart phones, laptop computers, digital broadcasting terminals, personal digital assistants (PDAs), personal digital assistants (PMPs), navigation systems, slate PCs, tablet PCs, ultrabooks, smartwatches, and the like.

Figure 1:
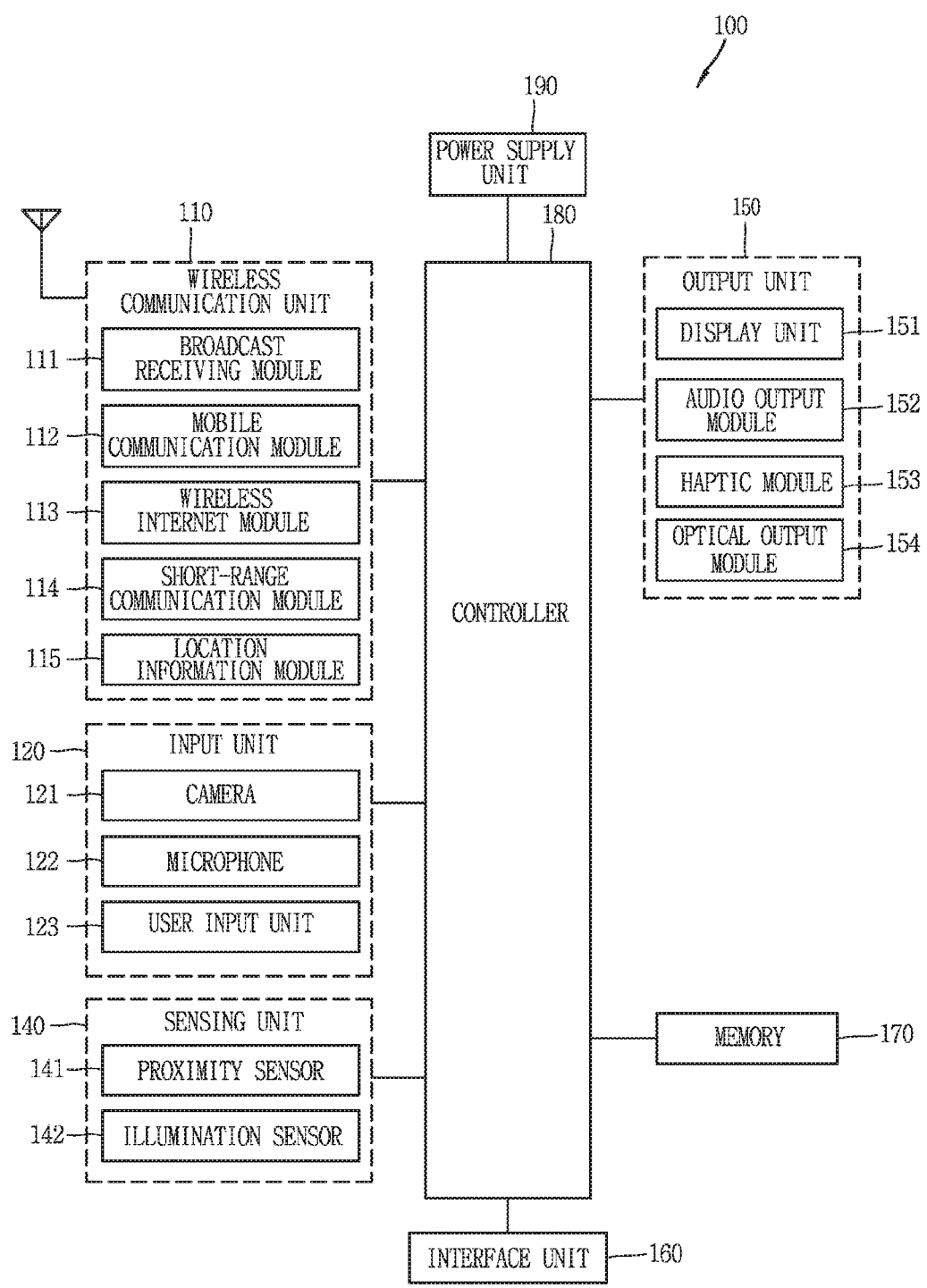
FIG. 1 is a block diagram of a head mounted display (HMD) in accordance with the present invention.

Referring to FIG. 1, FIG. 1 is a block diagram of a head mounted display (HMD) in accordance with the present invention.

The HMD 100 may be shown having components such as a wireless communication unit 110, an input unit 120, a sensing unit 140, an output unit 150, an interface unit 160, a memory 170, a controller (or control unit) 180, and a power supply unit 190. It is understood that implementing all of the illustrated components is not a requirement, and that greater or fewer components may alternatively be implemented.

More specifically, among those components, the wireless communication unit 110 may include at least one module for allowing wireless communication between the HMD 100 and a wireless communication system, between the HMD 100 and another HMD, between the HMD 100 and a mobile or stationary terminal, between the HMD 100 and a control device, between the HMD 100 and a camera externally installed to perform wireless communication, or between the HMD 100 and an external server.

Further, the wireless communication unit 110 may typically include one or more modules which connect the HMD 100 to one or more networks.

The wireless communication unit 110 may include at least one of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the HMD, the surrounding environment of the HMD, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The HMD disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154.

The interface unit 160 serves as an interface with various types of external devices that are coupled to the HMD 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the HMD 100 may perform assorted control functions associated with a connected external device, in response to the external device being connected to the interface unit 160.

The memory 170 is typically implemented to store data to support various functions or features of the HMD 100. For instance, the memory 170 may be configured to store application programs executed in the HMD 100, data or instructions for operations of the HMD 100, and the like. Some of these application programs may be downloaded from an external server via wireless communication. Other application programs may be installed within the HMD 100 at time of manufacturing or shipping, which is typically the case for basic functions of the HMD 100 (for example, receiving a call, placing a call, receiving a message, sending a message, and the like). Application programs may be stored in the memory 170, installed in the HMD 100, and executed by the controller 180 to perform an operation (or function) for the HMD 100.

The controller 180 typically functions to control an overall operation of the HMD 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the HMD to activate the application program.

The power supply unit 190 may be configured to receive external power or provide internal power in order to supply appropriate power required for operating elements and components included in the HMD 100. The power supply unit 190 may include a battery, and the battery may be configured to be embedded in the terminal body, or configured to be detachable from the terminal body.

At least part of the components may cooperatively operate to implement an operation, a control or a control method of an HMD according to various embodiments disclosed herein. Also, the operation, the control or the control method of the HMD may be implemented on the HMD by an activation of at least one application program stored in the memory 170.

Hereinafter, description will be given in more detail of the aforementioned components with reference to FIG. 1A, prior to describing various embodiments implemented through the HMD 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be provided in the HMD 100 to facilitate simultaneous reception of two or more broadcast channels, or to support switching among broadcast channels.

The broadcast management server may be a server that generates and transmits a broadcast signal and/or broadcast associated information or a server that receives a previously generated broadcast signal and/or broadcast associated information and transmits the same to a device (e.g., a control device, a terminal, etc.) which is connected to the HMD to control the HMD. The broadcast signal may include a TV broadcast signal, a radio broadcast signal, a data broadcast signal, and the like. Also, the broadcast signal may further include a broadcast signal in a form that a TV or radio broadcast signal is combined with a data broadcast signal.

The broadcast signal may be encrypted by at least one of technical standards (or broadcasting methods, e.g., ISO, IEC, DVB, ATSC, etc.) for transmitting and receiving a digital broadcast signal. The broadcast receiving module 111 may receive the digital broadcast signal using a method suitable for a technical standard selected from those technical standards.

Examples of the broadcast associated information may include information associated with a broadcast channel, a broadcast program, a broadcast service provider, and the like. The broadcast associated information may be provided via a mobile communication network. In this case, the broadcast associated information may be received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like. The broadcast signal and/or the broadcast related information received through the broadcast receiving module 111 may be stored in the memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports, through wireless area networks, wireless communications between the HMD 100 and a wireless communication system, between the HMD 100 and another HMD, between the HMD 100 and a mobile or stationary terminal, between the HMD 100 and a control device, between the HMD 100 and a camera externally installed to perform wireless communication, or between the HMD 100 and an external server. One example of the wireless area networks is a wireless personal area networks.

Here, the HMD may be a device (e.g., a mobile phone, a smart phone, a smartwatch, a laptop computer, a controller, etc.) which can exchange data with (or cooperative with) the HMD 100. The short-range communication module 114 may sense (or recognize) a device, which can perform communication with the HMD 100, in the vicinity of the HMD 100. In addition, when the sensed device is a device which is authenticated to communicate with the HMD 100, the controller 180, for example, may cause transmission of at least part of data processed in the HMD 100 to the device or at least part of data processed in the device to the HMD 100 via the short-range communication module 114.

Hence, a user of the HMD 100 may use the data processed in the device through the HMD 100. For example, when a call is received in the device, the user may answer the call using the HMD 100. Also, when a message is received in the device, the user may check the received message using the HMD 100.

The location information module 115 is a module for acquiring a position (or a current position) of the HMD 100. As an example, the location information module 115 includes a Global Position System (GPS) module or a Wi-Fi module. For example, when the HMD uses a GPS module, a position of the HMD may be acquired using a signal sent from a GPS satellite. As another example, when the HMD uses the Wi-Fi module, a position of the HMD may be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the HMD. The location information module 115 is a module used for acquiring the position (or the current position) of the HMD, and may not be limited to a module for directly calculating or acquiring the position of the HMD.

Next, the input unit 120 is configured to permit various types of inputs to the HMD 100. Examples of such inputs include image information (or signal), audio information (or signal), data or various information input by a user, and may be provided with one or a plurality of cameras 121. Such cameras 121 may process image frames of still pictures or video obtained by image sensors in a video or image capture mode. The processed image frames can be displayed on the display unit 151 or stored in memory 170. Meanwhile, the cameras 121 provided in the HMD 100 may be arranged in a matrix configuration to permit a plurality of images having various angles or focal points to be input to the HMD 100. Also, the cameras 121 may be located in a stereoscopic arrangement to acquire left and right images for implementing a stereoscopic image.

The microphone 122 processes an external audio signal into electric audio (sound) data. The processed audio data may be processed in various manners according to a function being executed in the HMD 100. If desired, the microphone 122 may include assorted noise removing algorithms to remove unwanted noise generated in the course of receiving the external audio signal.

The user input unit 123 is a component that permits input by a user. Such user input may enable the controller 180 to control an operation of the HMD 100. The user input unit 123 may include one or more of a mechanical input element (for example, a mechanical key, a button located on a front and/or rear surface or a side surface of the HMD 100, a dome switch, a jog wheel, a jog switch, and the like), or a touch-sensitive input element, among others. As one example, the touch-sensitive input element may be at least one of a touch pad and a touch panel.

The sensing unit 140 is generally configured to sense one or more of internal information of the HMD, surrounding environment information of the HMD, user information, or the like, and generate a corresponding sensing signal. The controller 180 generally cooperates with the sending unit 140 to control operation of the HMD 100 or execute data processing, a function or an operation associated with an application program installed in the HMD 100 based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the HMD covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch-sensitive input element of the user input unit 123 is implemented as a capacitance type, the proximity sensor 141 may sense proximity of a pointer having conductivity by changes of an electromagnetic field, which is responsive to an approach of the pointer. In this case, the user input unit 123 itself may also be categorized as a proximity sensor.

The term "proximity touch" will often be referred to herein to denote a motion (action) that the pointer is closely located above the user input unit 123 without being in contact with the user input unit 123. The term "contact touch" will often be referred to herein to denote a motion (action) that the pointer is actually brought into contact with the user input unit 123. For the position corresponding to the proximity touch of the pointer relative to the user input unit 123, such position will correspond to a position where the pointer is perpendicular to the user input unit. The proximity sensor 141 may sense proximity touch, and proximity touch patterns (for example, distance, direction, speed, time, position, moving status, and the like). In general, the controller 180 processes data corresponding to proximity touches and proximity touch patterns sensed by the proximity sensor 141, and cause output of visual information on the display unit 151. In addition, the controller 180 may control the HMD 100 to execute different operations or process different data (or information) according to whether a touch with respect to the same point on the user input unit 123 is either a proximity touch or a contact touch.

A touch sensor senses a touch (or a touch input) applied to the user input unit 123 using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the user input unit 123, or convert capacitance occurring at a specific part of the user input unit 123, into electric input signals. The touch sensor may also be configured to sense a touch position, a touch area, touch pressure, and touch capacitance when a touch object touches the user input unit 123. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the user input unit 123 has been touched. Here, the touch controller may be a component separate from the controller 180, the controller 180, and combinations thereof.

Meanwhile, the controller 180 may execute the same or different controls according to a type of touch object that touches the user input unit 123. Whether to execute the same or different control according to a type of a touch object may be decided based on a current operating state of the HMD 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the HMD 100. For example, the display unit 151 may display execution screen information of an application program executing at the HMD 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit by a stereoscopic processing unit. The stereoscopic processing unit may receive the 3D image (an image of a reference time point and an image of an extension time point), and extract the left image and the right image, or may receive 2D images and change them into a left image and a right image.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the HMD 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 may be controlled by user selection or setting by the controller 180. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 may also be implemented to allow the user to feel a tactile effect through a muscle sensation such as the user's head, face, fingers or arm, as well as transferring the tactile effect through direct contact. Two or more haptic modules 153 may be provided according to the particular configuration of the HMD 100.

An optical output module 154 may output a signal for indicating an event generation using light of a light source of the HMD 100. Examples of events generated in the HMD 100 may include a message reception, a call signal reception, a missed call, an alarm, a schedule notice, an email reception, information reception through an application, an output of an image (image, video, etc.) and the like. That is, the optical output module 154 may notify that the HMD 100 is performing a specific operation (function) by the user.

A signal output by the optical output module 154 may be implemented in such a manner that the HMD emits monochromatic light or light with a plurality of colors. The signal output may be terminated in response to the HMD sensing a user's event confirmation, or an operation currently performed in the HMD being ended.

The interface unit 160 serves as an interface for every external device to be connected with the electronic device 100. For example, the interface unit 160 may receive data transmitted from an external device, receive power to transfer to elements and components within the HMD 100, or transmit internal data of the HMD 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the HMD 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the HMD 100 is connected with an external cradle, the interface unit 160 may serve as a passage to allow power from the cradle to be supplied to the HMD 100 or may serve as a passage to allow various command signals input by the user from the cradle to be transferred to the HMD therethrough. Various command signals or power input from the cradle may operate as signals for recognizing that the HMD 100 is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The HMD 100 may also be operated in relation to a network storage device that performs the storage function of the memory 170 over a network, such as the Internet.

Meanwhile, as aforementioned, the controller 180 may typically control operations relating to application programs and the general operations of the HMD 100. For example, the controller 180 may set or release a lock state for restricting a user from inputting a control command with respect to applications when a status of the HMD meets a preset condition.

The controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein on the HMD 100 according to the present invention.

The power supply unit 190 receives external power or provides internal power and supply the appropriate power required for operating respective elements and components included in the mobile terminal 100 under the control of the controller 180. The power supply unit 190 may include a battery, which is typically rechargeable or be detachably coupled to the HMD Body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2A:
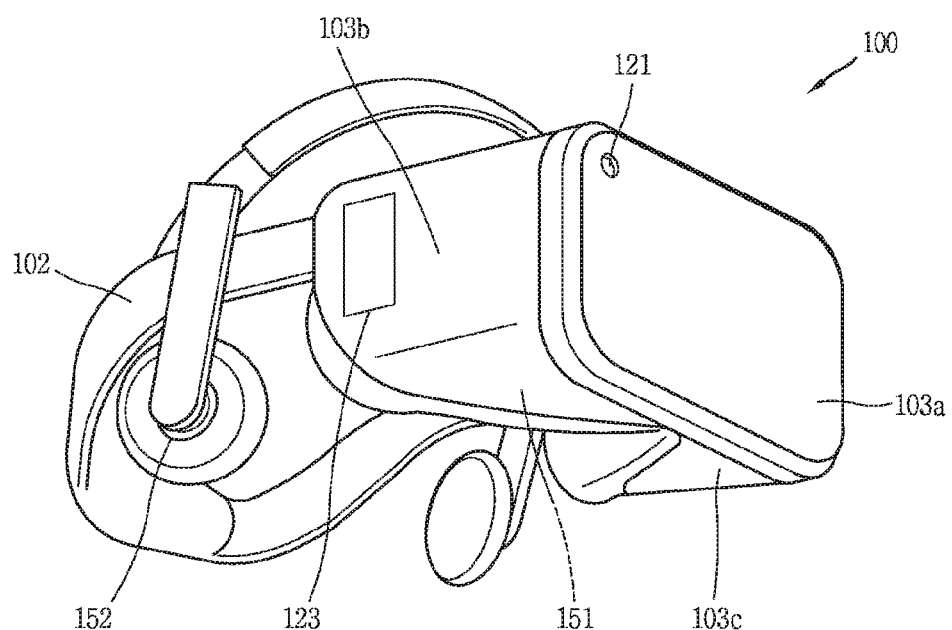
FIGS. 2A and 2B are conceptual views of an HMD according to one embodiment, viewed in one direction.

Referring to FIG. 2A, FIG. 2A is a conceptual view illustrating an HMD related to the present invention, viewed in one direction.

Referring to FIG. 2A, the HMD 100 according to the present invention may be formed to be worn on a head portion of a human body (or a head, a face, etc.), and include a frame part (a case, a housing, a cover, etc.). The frame part may be formed of a flexible material to facilitate wearing. This drawing illustrates that the frame part includes a first frame 101 and a second frame 102 which are made of different materials.

For example, the first frame 101 may serve to provide a space in which at least one of the components described with reference to FIG. 1 can be disposed, and the second frame 102 may serve to support (or fix) the first frame 101 to be mounted on the head portion of the human body.

The frame part may be referred to as a main body (or an HMD main body) or a body (or an HMD body). Here, the HMD main body (or the HMD body) may also be understood as a conception referring to as at least one assembly.

The frame part is supported on the head portion, and defines a space for mounting various components. As illustrated, electronic components such as a camera 121, an output unit, a user input unit 123, a controller (or control unit), a sensing unit, and the like may be mounted on the first frame 101. Here, the display unit 151 may be formed to cover at least one of left and right eyes of a user (or at least one of the left and right eyes of the user), and may be detachably provided.

The second frame 102 may be provided with an electronic component such as the audio output module 152 or the like. However, the present invention is not limited to this, and the components described in FIG. 1 and the components necessary for the HMD may be variously arranged in the first frame 101 and the second frame 102 according to a user selection.

The controller 180 (see FIG. 1) is configured to control various electronic components included in the HMD 100. The processor 180 may be understood as a component corresponding to the controller 180 described in FIG. 1.

The display unit 151 is mounted on the frame part and outputs screen information (e.g., image, moving picture, video, etc.) to the front of the user's eyes. When the user wears the HMD 100, the display unit 151 may be arranged to correspond to at least one of the left eye and the right eye so that screen information can be displayed in front of the user's eyes. This drawing illustrates that the display unit 151 is positioned so as to cover both the left and right eyes so that an image can be output toward both the left and right eyes of the user.

Also, the display unit 151 may project an image to the user's eyes using a prism. Further, the prism may be formed to be transmissive so that the user can view the projected image and a general front view (a range viewed by the user through the eyes) together.

As described above, the image output through the display unit 151 may be viewed in a manner of overlapping the general view. The HMD 100 may provide Augmented Reality (AR), in which a virtual image is superimposed on a real image or a background to be viewed as a single image, by using the characteristics of the display.

In addition, the display unit 151 of the HMD according to the present invention may be located inside the main body. Specifically, when the HMD is worn on the user's head, the display unit 151 may be disposed at a position facing the user's eyes inside the HMD.

The camera 121 is disposed adjacent to at least one of the left eye and the right eye, to capture (take, photograph) an image of a front side. Since the camera 121 is disposed adjacent to the eye to face forward, the camera 121 may acquire a scene viewed by the user as an image.

In addition, the HMD according to an embodiment of the present invention captures a preset object disposed outside by using the camera 121, and detects a movement (motion) of the main body of the HMD using a captured image of the preset object.

For example, the camera 121 may be a camera having a preset field of view (or a viewing angle). In addition, the camera 121 may capture a preset object included in a specific area located outside the HMD.

Here, the preset object may refer to all kinds of objects to be identified, which form specific information. That is, the preset object may include characters, symbols, images, and objects forming the specific information. For example, the preset object may be a plurality of light emitting elements arranged to form a specific pattern. That is, the plurality of light emitting elements may form specific pattern information according to spaced intervals therebetween or emitted light. As another example, the preset object may be a code (for example, a QR code) having specific meaning or an image, a symbol, and the like, which form a specific pattern.

The controller 180 may capture the preset object included in the specific area using the camera 121, and analyze an image of the preset object included in the captured image to determine the movement of the main body. For example, the controller 180 may determine the movement of the main body based on a degree that the image of the preset object included in the captured image is deformed. Also, the controller 180 may control an output state of the display unit 151 based on the movement of the main body. Detailed description related to this will be given later with reference to FIG. 4C.

This drawing illustrates that one camera 121 is provided, but the present invention is not limited thereto. The camera 121 may be provided in plurality to acquire a stereoscopic image.

The HMD 100 may include a user input unit 123 configured to receive a control command. The user input unit 123 may employ any method so long as it can be operated by the user in a tactile manner, such as touching or pushing. This drawing illustrates that the frame part is provided with the user input part 123 employing pushing and touching input manners.

In addition, the HMD 100 may be provided with a microphone (not illustrated) for receiving sound and processing the sound into an electric audio data, and an audio output module 152 for outputting sound. The audio output module 152 may be configured to transmit sound in a general sound output manner or a bone-conduction mode. In case where the audio output module 152 is implemented in the bone-conduction manner, when the user wears the HMD 100, the audio output module 152 is brought into close contact with the head and vibrates a skull to transmit sound.

Meanwhile, if the frame part including the first frame 101 and the second frame 102 is regarded as one HMD body (hereinafter, referred to as "main body"), the main body of the HMD related to the present invention may be configured in various forms. Specifically, the main body may include a plurality of surfaces 103a, 103b, and 103c having preset angles. The plurality of surfaces indicates outer surfaces of the main body of the HMD 100. From this perspective, the plurality of surfaces may indicate the surfaces (outer surfaces, etc.) of the HMD 100. Each of the plurality of surfaces 103a, 103b, and 103c may be flat or curved.

FIG. 2A illustrates a main body in which the plurality of surfaces 103a, 103b, and 103c are perpendicular to one another. Hereinafter, for the sake of convenience of explanation, an HMD formed so that a plurality of surfaces is perpendicular to one another will be described as an example. However, the same/like description may be applicable to all types of HMDs including a plurality of surfaces having preset angles.

Figure 2B:
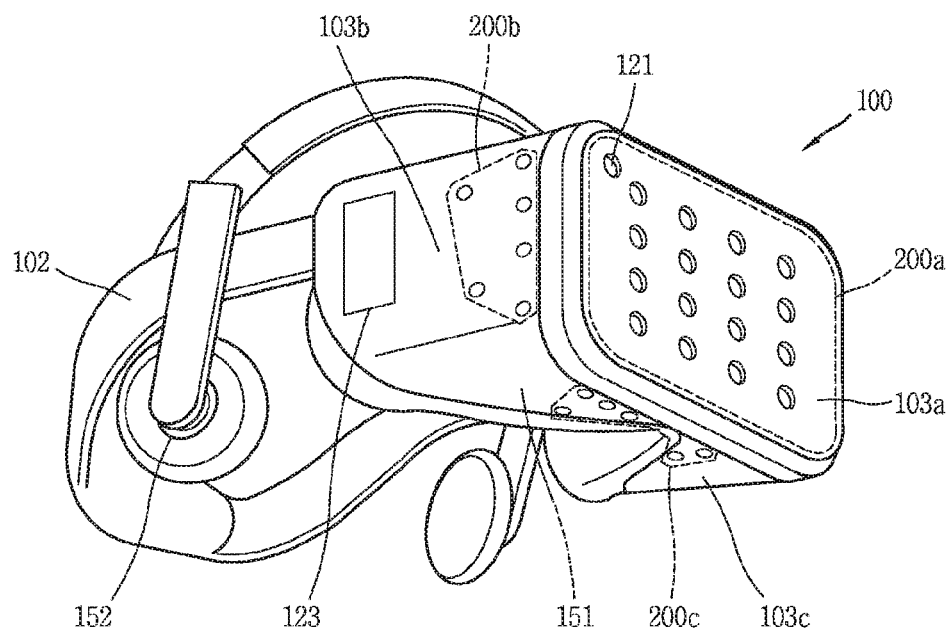

FIG. 2B is a conceptual view of an HMD according to another embodiment of the present invention, viewed in one direction.

The structure and configuration of the HMD illustrated in FIG. 2B may be substantially the same as the structure and configuration of the HMD described with reference to FIG. 2A. However, the preset object may be mounted on at least part of the plurality of surfaces 103a, 103b, and 103c forming the main body of the HMD 100 illustrated in FIG. 2B. For example, a plurality of light emitting units 200a, 200b, and 200c for emitting preset light to outside may be disposed on at least part of the plurality of surfaces 103a, 103b, and 103c. As another example, at least part of the plurality of surfaces 103a, 103b, and 103c may be provided with arbitrary images and symbols to form specific information.

On the other hand, a camera for capturing a preset viewing angle range (or a preset range of field of view) may be located on the outside of the HMD. The controller 180 may receive a captured image from the camera located at the outside using the wireless communication unit. In addition, the controller 180 may determine a posture of the HMD 100 by analyzing the captured image received from the external camera.

More specifically, when the main body having the preset object is included in the preset viewing angle range of the external camera, the captured image by the camera may include an image of the preset object. At this time, the controller 180 may determine the posture of the main body by analyzing a degree that the image of the preset object included in the captured image is deformed.

Here, the posture of the HMD 100 may be understood as a conception including a placed state of the HMD (a worn state of the HMD on the user's head), a tilted degree of the HMD, a direction that the HMD faces, a position of the HMD, a rotation of the HMD, a movement of the HMD, and the like. In addition, determining the posture of the HMD 100 in the present invention may include determining posture and movement of the user wearing the HMD 100.

When the posture of the HMD is determined as described above, the controller 180 may use the result to recognize the movement of the main body, and perform a control such as changing the output state of the display unit based on the movement of the main body. Hereinafter, this will be described in detail with reference to FIG. 4B.

As described above, when the image of the preset object included in the captured image with respect to the preset object is changed, the HMD according to the present invention may recognize the movement of the main body by analyzing the image change of the preset object When the movement of the main body is recognized, not only a movement that the main body is tilted but also a movement that the main body is moved in a horizontal direction without being tilted (e.g., a movement of the main body in parallel to left or right or forward or backward) may be precisely recognized.

In addition, the HMD according to the present invention may control various functions by using the movement of the main body when the movement of the main body is recognized. For example, it may be possible to control the output state of the display unit based on the movement of the main body, or perform a specific function based on a detection of a specific movement of the main body. If screen information output on the display unit is changed based on the movement of the main body, the user wearing the HMD according to the present invention may receive more realistic screen information.

When the movement of the main body is recognized based on the image change of the preset object included in the captured image, the image of the preset object may deviate from the preset viewing angle range of the camera due to the movement of the main body. In this case, the HMD according to the present invention may allow the user to recognize in various ways that the main body is out of a moving area of the main body, in which the main body is to be moved for a function control. Hereinafter, a related control method will be described with reference to the accompanying drawings.

Figure 3:
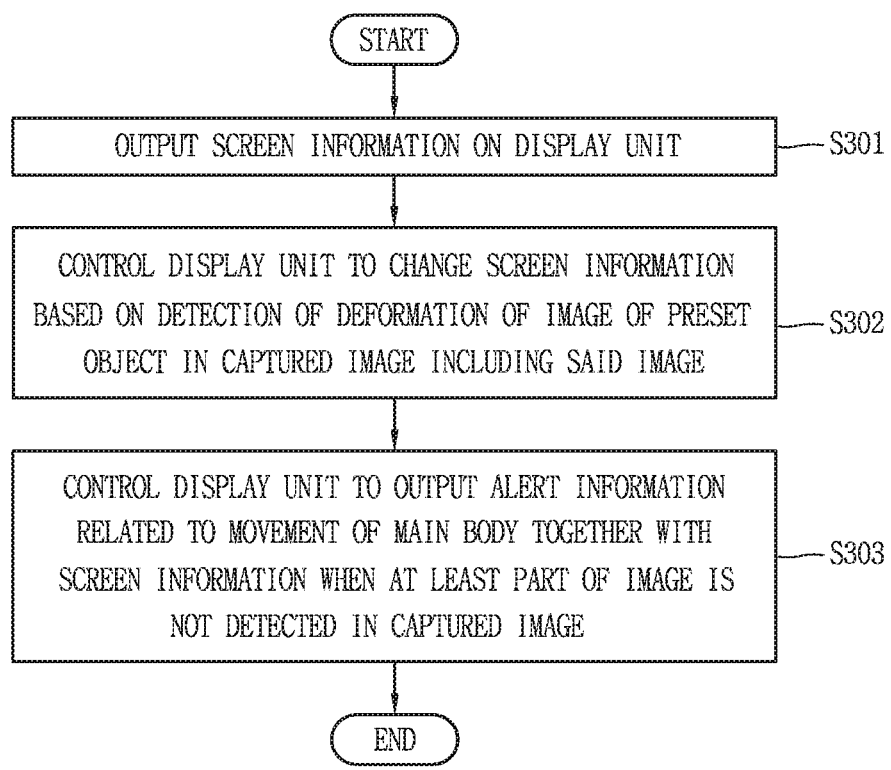
FIG. 3 is a flowchart illustrating a control method in accordance with the present invention.
Figure 4A:
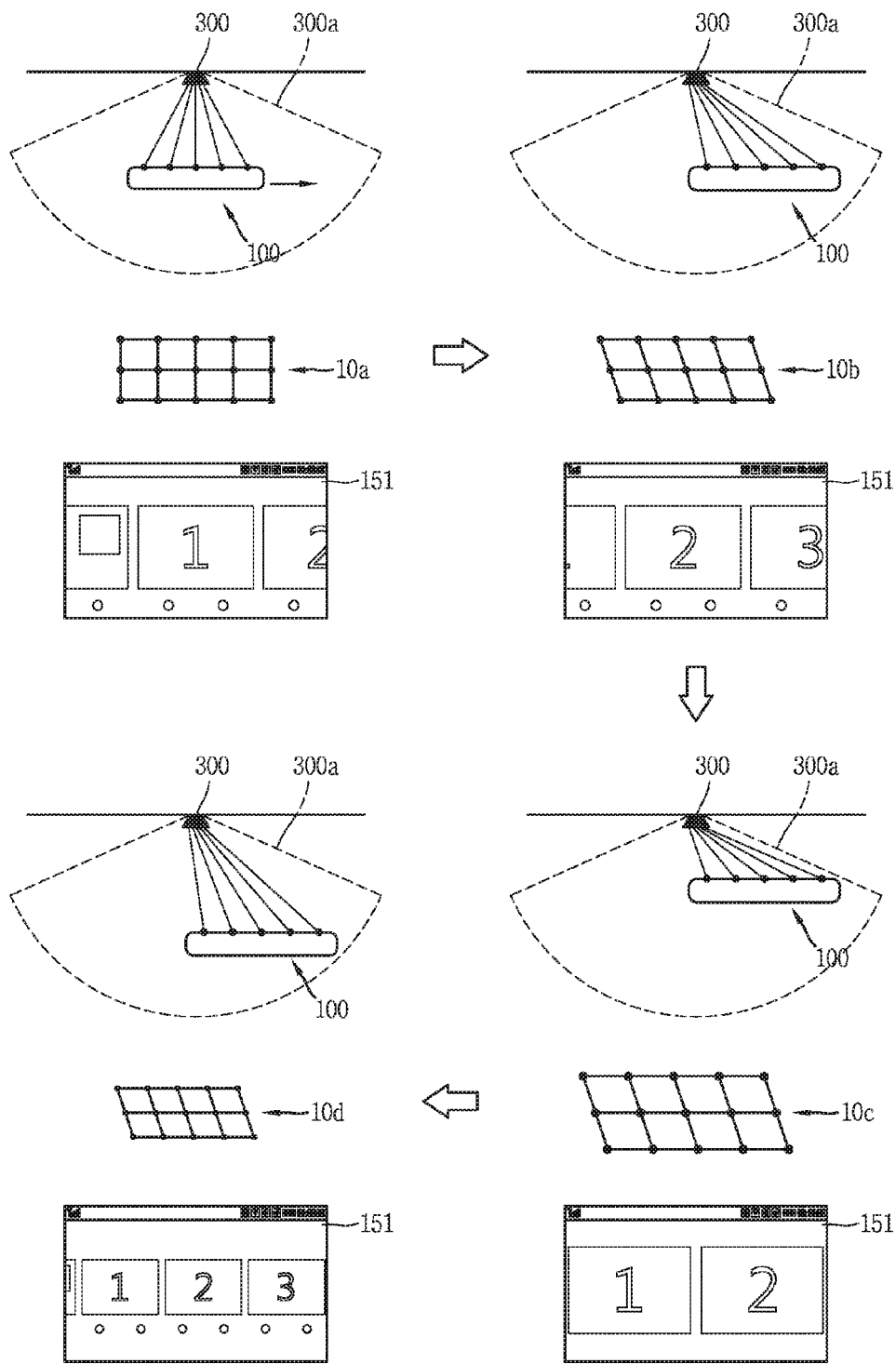
FIGS. 4A, 4B, and 4C are representative views illustrating a method of controlling an HMD in accordance with one embodiment of the present invention.
Figure 4B:
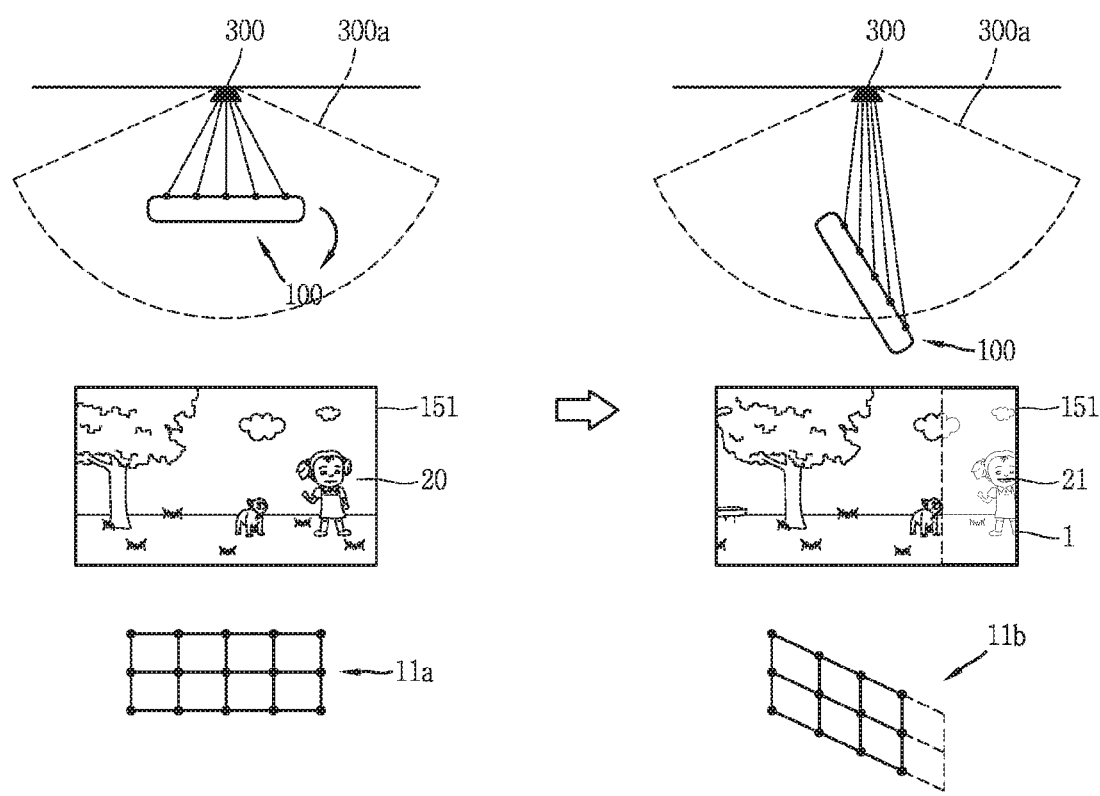
Figure 4C:
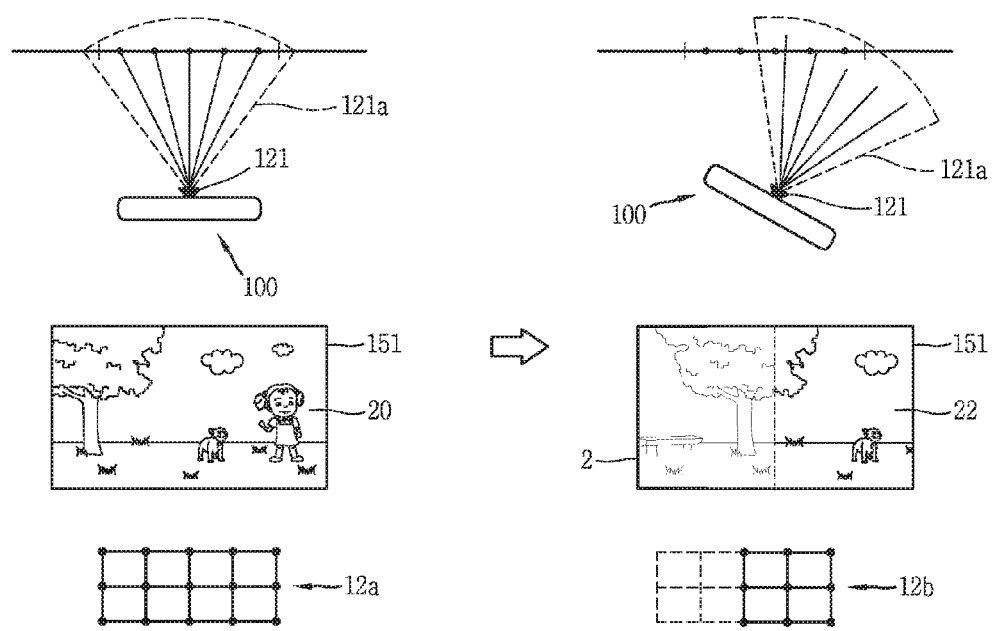

FIG. 3 is a flowchart illustrating a control method according to the present invention, and FIGS. 4A, 4B, and 4C are representative views illustrating a method of controlling an HMD in accordance with one embodiment of the present invention.

Referring to FIG. 3, screen information may be output on the display unit of the HMD according to one embodiment of the present invention (S301).

As described above with reference to FIGS. 2A and 2B, the display unit may be located at a position facing the user's eyes within the HMD, and may be configured to output screen information.

The screen information may be an execution screen corresponding to a function executable in the HMD. For example, the screen information may include an execution screen of a specific application, image information related to a stopped state, and image information related to a continuous image that changes according to a lapse of time.

When the main body moves while the screen information is output on the display unit 151, the controller 180 may change the screen information based on the movement of the main body.

More specifically, the HMD according to one embodiment of the present invention may acquire a captured image including an image of a preset object, in order to recognize a movement of the main body. Here, the preset object may refer to an object specified as an object to be analyzed in the captured image with respect to the movement of the main body. In addition, the preset object may include all kinds of objects (characters, symbols, images, objects, etc.) to be identified that form specific information, as described above with reference to FIG. 2A.

The captured image may be acquired from the camera that captures the preset object. In addition, the captured image may be obtained in different ways depending on the position of the camera.

For example, when the camera is mounted on the main body and the preset object is disposed outside the main body, the controller 180 may directly acquire the captured image from the camera mounted on the main body. Alternatively, when the camera is mounted at the outside of the main body and the preset object is mounted on at least part of the main body, the captured image may be obtained based on wireless communication with the external camera. As described above, the method of acquiring the captured image may differ depending on the structure of the HMD. This will be described later with reference to FIGS. 4B and 4C.

In addition, the controller 180 may control the display unit to change the screen information based on a detection of a deformation of an image of a preset object in the captured image including the image of the preset object (S302).

The image of the preset object may be, for example, a pattern image configured to form specific information. That is, referring to FIG. 4A, the preset object may be mounted on the main body of the HMD 100 according to one embodiment of the present invention, and the preset object may be captured by an external camera 300. Here, the preset object may be mounted to form a specific pattern on the main body.

Meanwhile, the external camera 300 may capture at least one subject included in a preset viewing angle range 300a. For example, when the main body of the HMD 100 is included in the viewing angle range 300a, the captured image may include an image of the main body of the HMD 100. Similar to the structure of FIG. 4A, when the preset object is mounted on the main body of the HMD 100, the image of the preset object may be included in the captured image.

When the preset object is mounted on the main body of the HMD 100, for convenience of explanation, the preset object is limited to a case of being mounted on a front surface of the main body of the HMD 100. However, the preset object may be mounted not only on the front surface of the main body but also on each of the plurality of surfaces forming the main body.

The controller 180 may detect a specific pattern image formed by the preset object in the captured image. For example, as illustrated in a first diagram of FIG. 4A, the controller 180 may detect a specific pattern image 10a formed by the preset object from the captured image.

In this case, when the main body of the HMD 100 is moved as illustrated in a second diagram of FIG. 4A, the controller 180 may detect a deformation of the image 10a in the captured image. The movement of the main body of the HMD 100 may be determined by analyzing a deformed image 10*b* detected from the captured image.

For example, when the deformed image 10*b* is determined to be tilted in a predetermined direction (for example, to left) as compared with the specific pattern image 10*a* detected before the movement of the main body of the HMD 100, the controller 180 may determine that the main body has been moved in an opposite direction to the predetermined direction.

The controller 180 may change the screen information based on the movement of the main body. For example, as illustrated in the first diagram of FIG. 4A, when the movement of the main body is detected while specific screen information is output on the display unit 151, the controller 180, as illustrated in a second diagram of FIG. 4B, may control the display unit 151 such that at least part of the specific screen information is moved to right.

Here, as illustrated in a third diagram of FIG. 4A, when the main body moves in a direction toward the external camera 300, the controller 180 may detect an enlarged image 10*c* of the deformed image 10*b* from the captured image.

The controller 180 may then control the display unit 151 such that the specific screen information output on the display unit 151 in the second diagram of FIG. 4A is enlarged to correspond to the enlarged image 10*c*.

Similarly, in this state, when the main body moves away from the external camera 300, as illustrated in a fourth diagram of FIG. 4A, the controller 180 may detect a deformed image 10*d* based on the movement of the main body from the captured image. The controller 180 may control the display unit 151 to output the specific screen information in a reduced manner according to a degree that the deformed image 10*d* is reduced from the enlarged image 10*c* due to the movement of the main body.

In such manner, the HMD according to the present invention can determine the movement of the main body by detecting the deformation of the image of the preset object from the captured image, and change the output state of the display unit to correspond to the movement of the main body.

FIG. 4A has illustrated the embodiment in which the captured image is acquired from the camera mounted on the outside of the HMD, but the camera may alternatively be mounted on the main body of the HMD, as illustrated in FIG. 2A. In this case, the captured image may be obtained from the camera mounted on the main body, and the preset object may be disposed outside the HMD.

Meanwhile, when at least part of the preset object deviates from a preset viewing angle range of the camera due to the movement of the main body, the controller 180 may output alert information indicating the deviation.

More specifically, when at least part of the image is not detected in the captured image, the controller 180 may control the display unit to display alert information related to the movement of the main body together with the screen information (S303).

When the preset object is fully included in the preset viewing angle range of the camera even if the main body moves, the controller may determine the movement of the main body based on the modification of the image of the preset object included in the captured image.

However, when the preset object deviates from the preset viewing angle range of the camera due to the movement of the main body, at least part of the image of the preset object may not be detected in the captured image. In this case, the controller 180 may analyze whether the entire image is detected in the captured image, and determine whether the preset object has deviated from the preset viewing angle range.

The controller 180 may provide alert information to the user to indicate that the main body is moving to an area where the movement of the main body cannot be determined when at least part of the image is not detected in the captured image. That is, the controller 180 may output alert information on the display unit 151 to indicate that the main body has moved out of the moving area of the main body in which the screen information output on the display unit 151 is controllable.

Here, the moving area may be determined based on the preset viewing angle range of the camera in which the preset object is captured.

The alert information may be various types of visual information indicating a specific movement of the main body. This will be described later with reference to FIG. 5.

Meanwhile, as described above, the camera may be an external camera disposed outside the HMD or a camera mounted on the HMD.

Referring to FIG. 4B, the camera for capturing the preset object may be an external camera 300 mounted at the outside, and the external camera 300 may have a preset viewing angle range 300*a*.

The external camera 300 may capture the preset object mounted on the main body of the HMD 100 and the controller 180 may acquire a captured image including an image of the preset object through wireless communication with the external camera 300.

When the captured image is acquired from the external camera 300, the controller 180, as illustrated in a first diagram of FIG. 4B, may detect an image 11*a*, which is formed based on an arrangement of the preset object, in the captured image.

In this case, when the main body of the HMD 100 moves as illustrated in a second diagram of FIG. 4B, the controller 180 may detect that the image of the preset object is deformed in the captured image.

That is, the controller 180 may detect a deformed image 11*b* of the image 11*a* and determine the movement of the main body using the deformed image 11*b*. The controller 180 may control the display unit 151 to output screen information 21, a part of which has been moved to right from previously-output screen information 20 to correspond to the movement of the main body (e.g., a case where the main body is rotated clockwise by a predetermined range).

Also, at least part of the preset object may deviate from the preset viewing angle range 300*a* due to the movement of the main body. In this case, the controller 180 may determine that the main body is out of the moving area of the main body by using at least part of the image of the preset object that has not been detected in the captured image.

In addition, the controller 180 may control the display unit 151 to output alert information, which indicates that the movement of the main body is out of the moving area of the main body, together with the screen information 21.

In this case, as illustrated in a second diagram of FIG. 4B, alert information 1 may be displayed along a periphery of the screen information 21 so as not to interfere with the output of the screen information 21. Also, the alert information 1 may be displayed in a partial area of the screen information 21 to correspond to a degree that the main body deviates from the preset viewing angle range 300*a*.

On the other hand, a camera for capturing the preset object may be mounted on the main body of the HMD. That is, as illustrated in a first diagram of FIG. 4C, a camera 121 having a preset viewing angle range 121a may be mounted on a front surface of the main body, to capture a preset object existing outside the main body.

At this time, when the main body is partially rotated clockwise, the image of the preset object may be deformed in the captured image. That is, the controller 180 may detect a deformed image 12b, as illustrated in a second diagram of FIG. 4C, in the captured image.

The controller 180 may control the display unit 151 such that the screen information 20 is changed to screen information 22, in which a partial area of the screen information 20 has moved to right, by reflecting the movement of the main body determined by the deformed image 12b.

In addition, when at least part of the image is not detected in the captured image, the controller 180 may analyze the image 12b of the remaining part of the image so as to determine the movement of the main body. The controller 180 may control the display unit 151 such that alert information indicating the deviation of the main body out of the moving area of the main body is output on one area of the screen information 22 together with the screen information 22.

In this manner, the HMD according to the present invention may analyze the change in the image of the preset object included in the captured image, recognize precisely various movements of the main body, and effectively control screen information using the recognized movements. Accordingly, the user can move the HMD in various ways while wearing the HMD to control the screen information to match his/her intention.

In addition, the HMD according to the present invention may provide a notification to the user when at least part of the image of the preset object deviates from the preset viewing angle range of the camera so that the user can accurately determine the movement of the main body. That is, the present invention may set the moving area of the main body, in which the movement of the main body can be determined, based on the viewing angle range of the camera, and provide alert information to the user when the main body is out of the moving area.

Accordingly, the user can control the screen information by moving the main body while recognizing a moved degree of the main body using the alert information, thereby preventing a drastic change of the screen information or a temporarily-stopped visual phenomenon.

The method of controlling the HMD according to the embodiment of the present invention, as illustrated in FIGS. 4B and 4C, may be implemented by both of the case where the camera is mounted on the main body of the HMD and the case where the camera is mounted at the outside of the HMD. However, the following description will focus on embodiments implemented based on the structure of the HMD illustrated in FIG. 2C and the camera position in FIG. 4B.

In addition, the preset object may include all kinds of targets (objects) to be identified, which form specific information. Hereinafter, for convenience of explanation, the following description will mainly be given of an example in which the preset object corresponds to a plurality of light emitting elements each emitting a preset type light, with reference to the following appended drawings.

That is, the plurality of light emitting elements may be mounted on the main body of the HMD to form a specific pattern, and an image captured by an external camera may include an optical image pattern formed by light emitted by each of the plurality of light emitting elements.

In addition, the controller 180 may determine a movement of the main body using a number of optical images forming the optical image pattern. More specifically, when the plurality of light emitting elements are all included within a preset viewing angle range of the camera, the controller 180 may determine that the number of optical images forming the optical image pattern formed by each of the plurality of light emitting elements is a reference number.

In addition, when at least part of the plurality of light emitting elements deviates from the preset viewing angle range due to the movement of the main body, the controller 180 may determine that the number of optical images forming the optical image pattern included in the captured image has been reduced to be smaller than the reference number.

In this case, the controller 180 may determine various movements of the main body based on a degree that the number of optical images forming the optical image pattern becomes smaller than the reference number. As a detailed example, the controller 180 may determine a moving speed of the main body based on a degree that the main body is out of the moving area or a degree that the number of optical images is reduced for a preset period of time.

The alert information may be output on the display unit 151 as various visual effects which can indicate that the main body is out of the moving area of the main body. In addition, the alert information may be output as a specific visual effect on at least part of the screen information so as not to affect the user receiving the screen information.

Figure 5A:
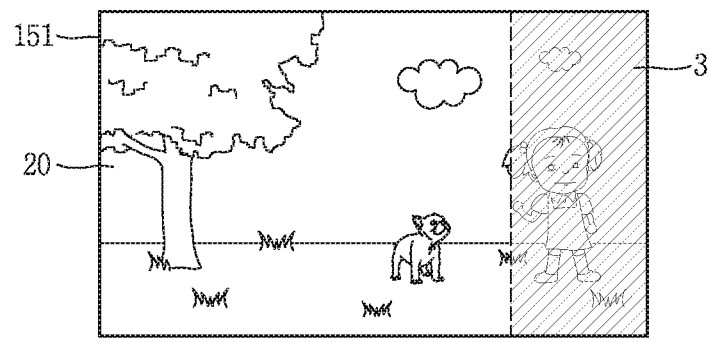
FIGS. 5A, 5B and 5C are views illustrating embodiments related to various output forms of alert information.
Figure 5B:
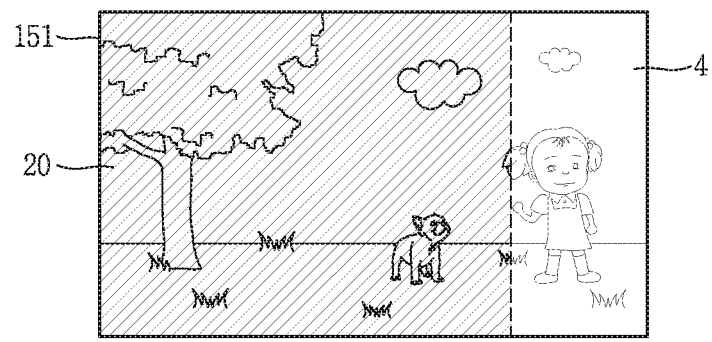
Figure 5C:
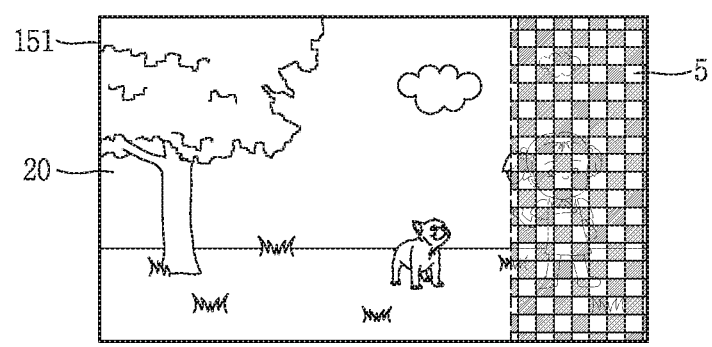

FIGS. 5A, 5B and 5C are views illustrating embodiments related to various output forms of alert information.

First, referring to FIG. 5A, when the main body is out of the moving area of the main body while the screen information 20 is output on the display unit 151, the controller 180 may recognize a degree that the main body is out of the moving area. For example, the controller 180 may determine a deviated degree of the main body from the moving area, based on a degree that the number of optical images forming the optical image pattern is detected to be smaller than the reference number in the captured image.

The controller 180 may specify a part of the screen information 20 to correspond to the deviated degree of the main body from the moving area, and output alert information 3 on the specified part. That is, as illustrated in FIG. 5A, the alert information may be output by a visual effect 3 in which a part of the screen information 20 is darkened to preset first brightness.

Alternatively, as illustrated in FIG. 5B, the alert information may be displayed by a visual effect 4 in which a part of the screen information specified to correspond to the deviated degree of the main body from the moving area is brightened to preset second brightness.

Also, as illustrated in FIG. 5C, the controller 180 may display the alert information using a visual effect 5 such as pixelation on the specified part of the screen information.

Although not illustrated, the alert information may also be displayed by a visual effect such as generating a border on a part of a periphery of the screen information, or blurring a part of the screen information.

In this way, since the alert information is output on a part of the screen information by the changed brightness or the specific visual effect while outputting the screen information, the user can recognize the movement of the main body while receiving the screen information without a limit.

Meanwhile, the controller 180 may control the output state of the display unit in various ways using a speed at which the main body moves out of the moving area. For example, when the main body moves out of the moving area at a first speed, the alert information may overlap the screen information corresponding to the first speed. In addition, when the main body completely deviates from the moving area at a second speed higher than the first speed, the controller 180 may overlap the alert information with the entire screen information.

More specifically, to recognize the moving speed of the main body, the controller 180 may determine a degree of change of at least part of the image, which has not been detected in the captured image for a preset time. That is, when the at least part of the image has changed to a first degree of change for a preset reference time, the controller 180 may control the display unit 151 to overlap the alert information with the part of the screen information so that the alert information corresponds to the first degree of change. When the at least part of the image has changed to a second degree of change, the controller 180 may control the display unit 151 to overlap the alert information with the entire screen information.

When the preset object is the plurality of light emitting elements, the controller 180 may determine the moving speed of the main body based on a degree of change of the number of optical images configuring the optical image pattern, detected for the preset reference time. In this case, the controller 180 may control the output state of the display unit 151 using a degree that the number of optical images detected for the preset time is reduced from the reference number. This will be described with reference to FIGS. 6A and 6B.

Figure 6A:
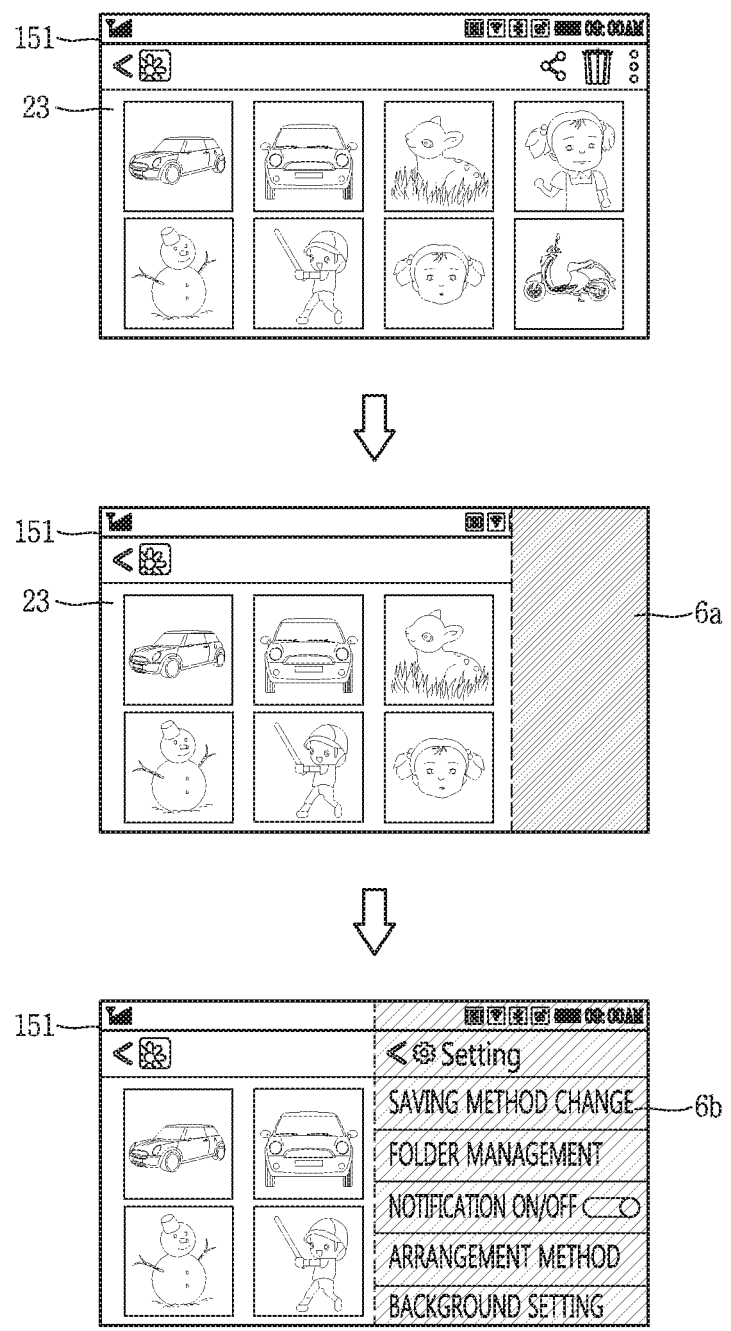
FIGS. 6A and 6B are views illustrating an embodiment for controlling an output (display) of alert information based on a moving speed of a main body.
Figure 6B:
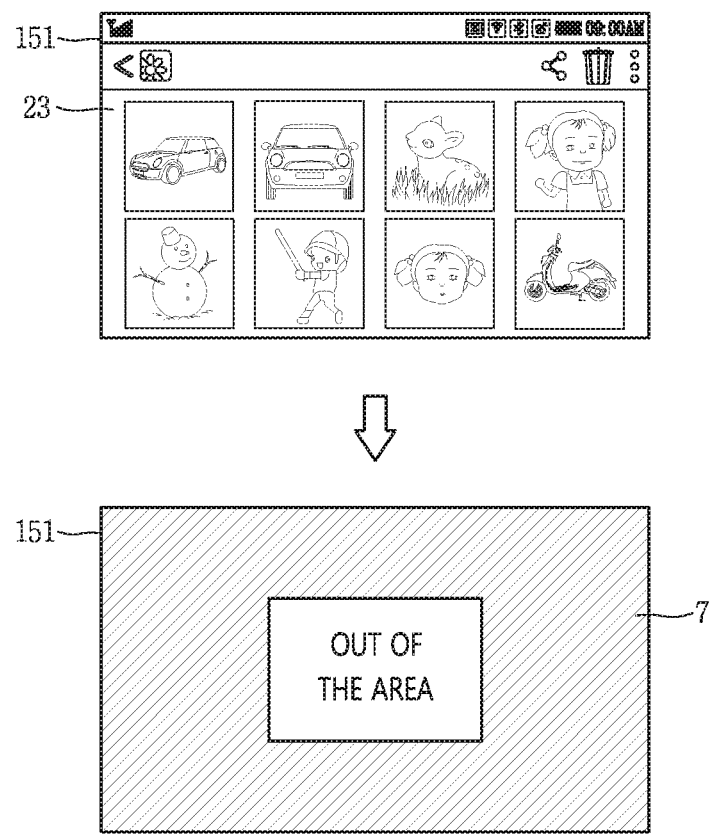

FIGS. 6A and 6B are views illustrating an embodiment for controlling an output of alert information based on a moving speed of a main body.

First, referring to FIG. 6A, when the main body moves in a state in which screen information 23 is output on the display unit 151, as illustrated in a second diagram of FIG. 6A, the controller 180 may output alert information 6a to overlap a part of the screen information 23.

More specifically, the controller 180 may determine the degree to which the number of optical images constituting the optical image pattern is reduced from the reference number for a preset time. For example, when the number of optical images constituting the optical image pattern is detected to be smaller than the reference number by a specific number for the preset time, the controller 180 may determine that the main body moves at a first speed.

The controller 180 may control the display unit 151 such that the alert information overlaps the screen information to correspond to the first speed. For example, the controller 180 may calculate a ratio of the specific number to the reference number, and specify one area, which corresponds to the calculated ratio in the screen information. Also, the controller 180 may control the display unit 151 such that the alert information gradually overlaps at the first speed from an edge of the screen information to the specified one area for the preset time.

When the main body continuously moves at the first speed while the alert information 6a overlaps the one area of the screen information 23, the controller 180 may include specific information in the alert information.

More specifically, when at least part of the image which is not detected in the captured image is changed to a first degree of change, the controller 180 may control the display unit 151 such that the alert information overlaps a part of the screen information. When a rate that the alert information overlaps the screen information corresponds to a preset ratio, the controller 180 may control the display unit 151 to display the specific information in the alert information.

For example, after the alert information is displayed, when the number of optical images constituting the optical image pattern is detected as many as a preset threshold coefficient based on the movement of the main body, the controller 180 may further provide the specific information in the alert information.

That is, as illustrated in a third diagram of FIG. 6A, the alert information may include as the specific information 6b menu information for changing settings in relation to a function corresponding to the screen information 23.

In this way, since the controller 180 displays the alert information corresponding to the moving speed of the main body, the user can move the main body while recognizing the movement of the main body. In addition, when a continuous movement of the main body is detected after the output of the alert information, specific information may be additionally provided in the alert information so as to match the intention of the user who continuously moves the main body.

On the other hand, the user may move the main body at a second speed that is faster than the first speed. That is, as illustrated in a first diagram of FIG. 6B, in a state where screen information 23 is output on the display unit 151, the main body may move at the second speed within the preset time.

For example, the second speed may be a speed at which the main body moves so as to completely deviate from the moving area of the main body for the preset time. That is, in case where the entire image of the preset object is not detected for the preset reference time, for example, when the number of optical images constituting the optical image pattern is detected as being reduced by the reference number, the controller 180 may determine that the main body has moved at the second speed.

The controller 180, as illustrated in a second diagram of FIG. 6B, may control the display unit 151 such that alert information 7 overlaps the entire screen information 23. In addition, the alert information 7 may control the display unit 151 to output information indicating that the main body has moved out of the moving area.

In this way, when the main body completely deviates from the moving area within the preset reference time, the controller 180 may determine that the user does not intend to use the screen information, and then control the alert information to overlap the entire screen information.

The user wearing the HMD can not only unintentionally move the main body away from the moving area of the main body, but also intentionally move the main body away from the moving area of the main body. Therefore, the present invention can control the output state of the display unit based on the moving speed of the main body, thereby performing more assorted control for the user's intention.

As described above with reference to FIG. 6A, when the main body continuously moves at the first speed while the alert information is displayed, specific information may be additionally output in the alert information. Hereinafter, an embodiment related to the specific information will be described with reference to FIGS. 7A and 7B.

Figure 7A:
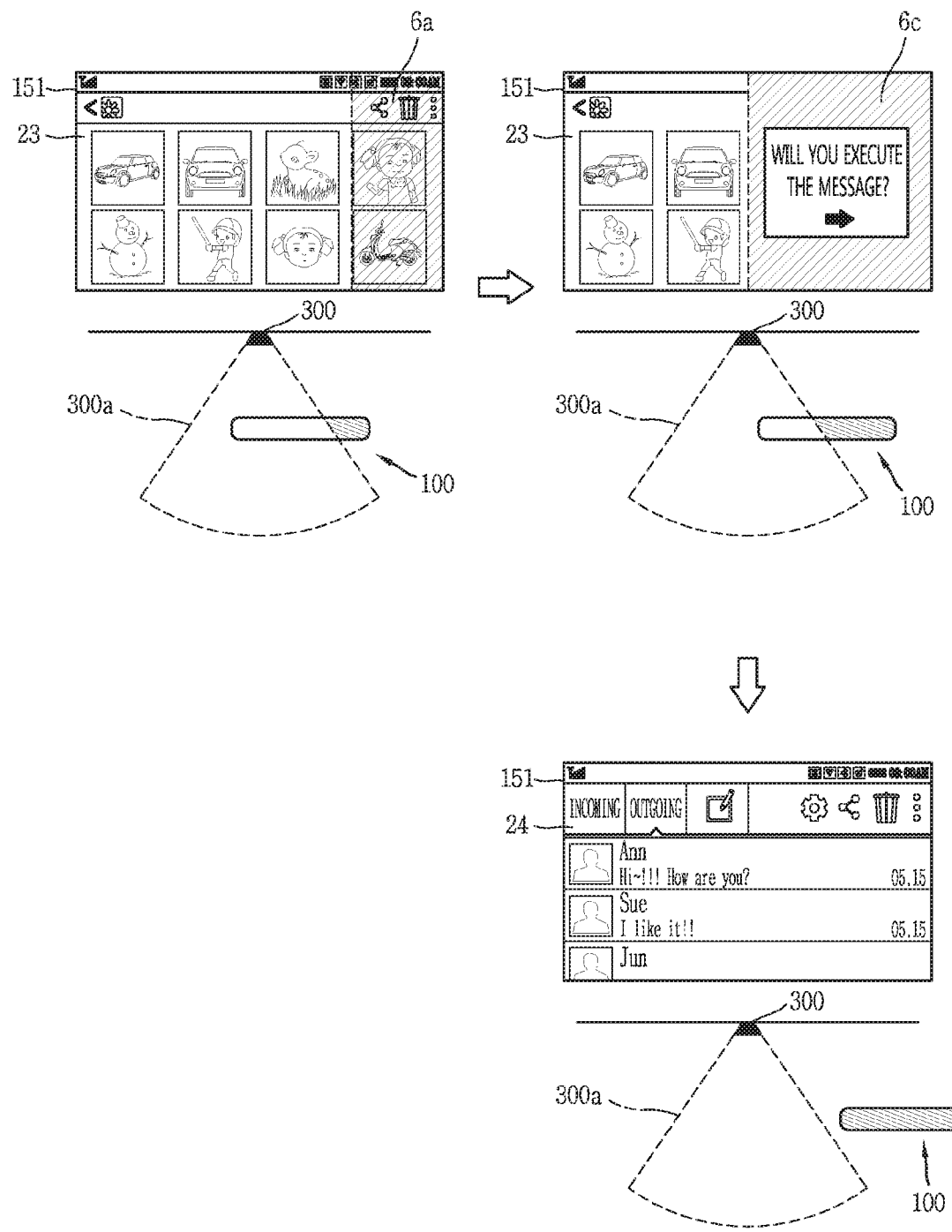
FIGS. 7A and 7B are views illustrating an embodiment related to an execution of a function related to specific information when the main body is moved in a state where the specific information is additionally displayed together with alert information.
Figure 7B:
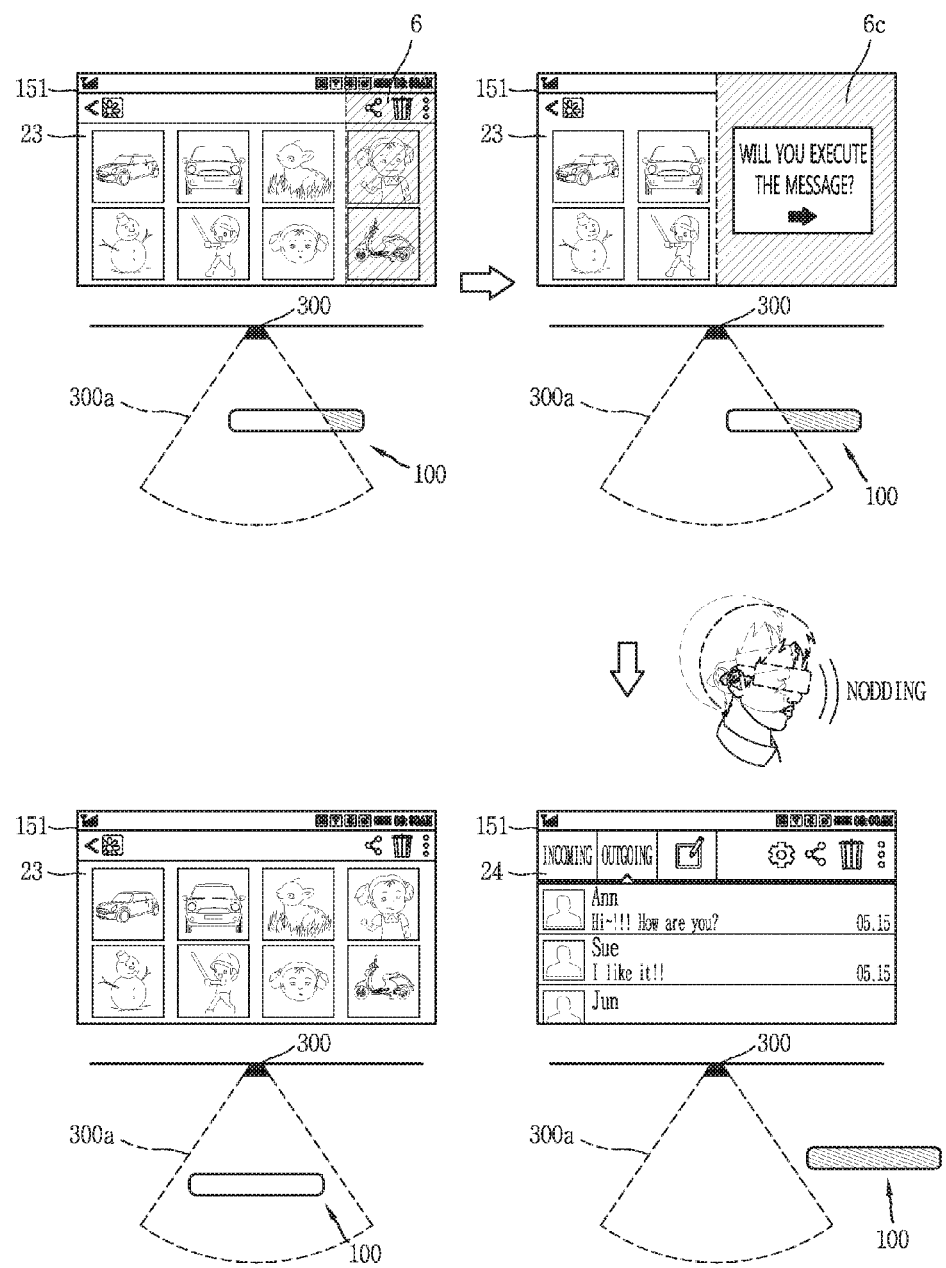

FIGS. 7A and 7B are views illustrating an embodiment related to an execution of a function related to the specific information when the main body moves in a state where the specific information is additionally displayed in alert information.

First, referring to FIG. 7A, when a part of the main body is out of the moving area in a state where screen information 23 is output on the display unit 151, the controller 180 may output alert information on the screen information 23.

More specifically, the controller 180 may calculate a moving speed of the main body based on a degree of change of at least part of the image which is not detected from the captured image received from the external camera 300 for a preset reference time. The controller 180 may control the display unit 151 so that the alert information 6a overlaps a part of the screen information 23 to correspond to a degree of change (a first degree of change) of the at least part of the image.

In addition, when an overlap ratio of the alert information 6a with the screen information 23 corresponds to a specific ratio, specific information may be displayed in the alert information 6a. For example, when the preset object is the plurality of light emitting elements, the controller 180 may detect a change in the number of optical images constituting the optical image pattern in the captured image.

When the number of optical images constituting the optical image pattern is detected as many as a preset threshold number based on the movement of the main body, the controller 180 may display specific information in the alert information. For example, as illustrated in a second diagram of FIG. 7A, the specific information may be recommendation information 6c for another function different from a function corresponding to the screen information 23.

When the entire image is not detected in the captured image based on the movement of the main body in a state where the recommendation information 6c is output on the alert information (when the optical images constituting the optical image pattern are not detected any more in case where the preset object is the plurality of light emitting elements), the controller may determine that the main body has completely deviated from the moving area.

And, as illustrated in a third diagram of FIG. 7A, the controller 180 may execute the another function included in the recommendation information 6c, and control the display unit 151 to output an execution screen 24 in response to the execution of the another function. In this case, the controller 180 may terminate the execution of the function corresponding to the screen information 23, in response to the execution of the another function.

Although not illustrated, when the another function is a function that is controllable based on the movement of the main body, the controller 180 may provide the user with information recommending the movement of the main body such that the main body is located in the moving area. In this case, the controller 180 may temporarily suspend the execution of the another function until the main body is located in the moving area.

Accordingly, the user can be provided with information of another function executable while controlling the screen information with moving the main body, and also provided with convenience in easily executing the another function by a continuous movement of the main body.

On the other hand, when a preset gesture is detected by the sensing unit while the recommendation information is provided, the controller 180 may execute the another function included in the recommendation information while executing the function corresponding to the screen information.

That is, as illustrated in a second diagram of FIG. 7B, in a state where the recommendation information 6c related to the another function different from the function corresponding to the screen information 23 is output in the alert information, the user's preset gesture may be detected by the sensing unit. For example, the preset gesture, as illustrated in a second diagram of FIG. 7B, may be a gesture that the user wearing the main body nods the head.

With no limit to this, the preset gesture may be defined as various gestures such as a gesture of tilting the main body in a specific direction, a gesture of shaking the main body in left and right directions by a preset number of times, a blinking gesture, and the like.

When the preset gesture is detected, the controller 180 may execute the another function included in the recommendation information while maintaining the execution of the function corresponding to the screen information. The controller 180, as illustrated in a third diagram of FIG. 7B, may then control the display unit 151 such that the screen information 23 is changed to an execution screen 24 according to the execution of the another function.

That is, the screen information 23 may be temporarily restricted from being output on the display unit 151 based on the execution of the another function. In this state, when the main body moves to be located in the moving area, the controller 180 may detect the entire image in the captured image.

For example, when the preset object is the plurality of light emitting elements, the controller 180 may detect a change in the number of optical images constituting the optical image pattern in the captured image. When the number of optical images constituting the optical image pattern is detected as the reference number in the state where the execution screen 24 is output according to the execution of the another function, the controller 180 may control the display unit 151 to change the execution screen 24 back to the screen information 23. Also, when the screen information 23 is output on the display unit 151 again, the controller 180 may terminate the execution of the another function.

When the screen information is image information for a continuous image that changes according to a lapse of time, the controller 180 may specify an image output on the display unit 151 at a time point when the another function is executed. Then, after temporarily suspending the image information in the specified image, the image information may be changed to the execution screen of the another function. Thereafter, when the execution of the another function is terminated, the controller may control the display unit 151 to output the specified image included in the image information.

In this way, in a state where the recommendation information is provided, the controller 180 may simultaneously execute the another function and the function corresponding to the screen information, in response to the detection of the preset gesture. Although not illustrated, the controller 180 may temporarily execute the another function, in response to a specific voice input or touch input being applied by a user, as well as the detection of the preset gesture.

Therefore, when the user wants to temporarily use the another function (for example, a function of confirming a new event generated in the HMD), the user can execute the another function simply by applying a specific gesture.

On the other hand, when the execution of the function corresponding to the screen information is maintained together with the execution of the another function, the controller 180 may output the execution screen of the another function and the screen information simultaneously on the display unit 151.

Figure 8A:
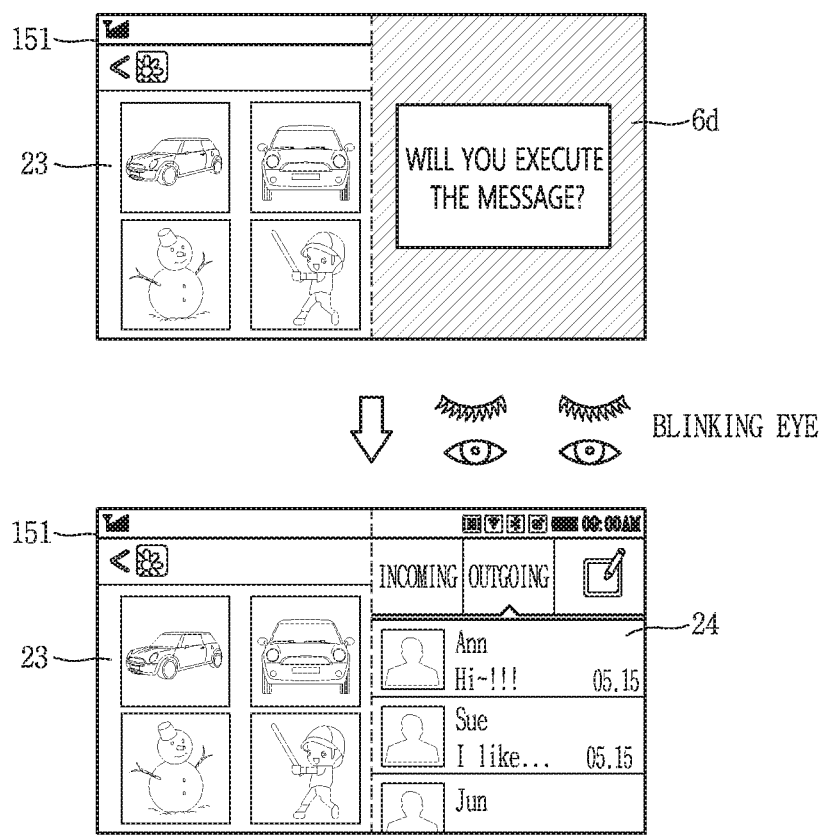
FIGS. 8A and 8B are views illustrating an embodiment related to multitasking of a function corresponding to screen information and another function included in recommendation information.
Figure 8B:
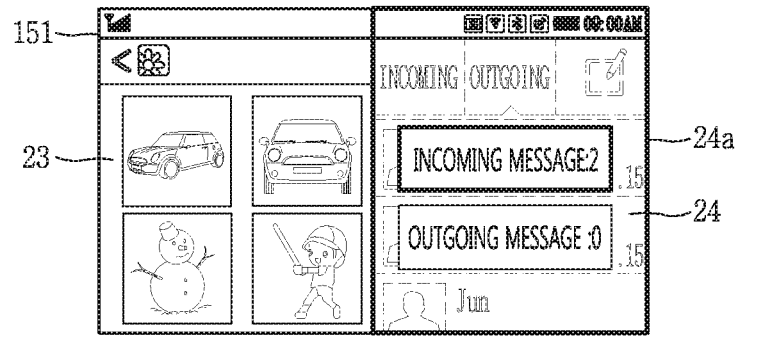
Figure 8B:
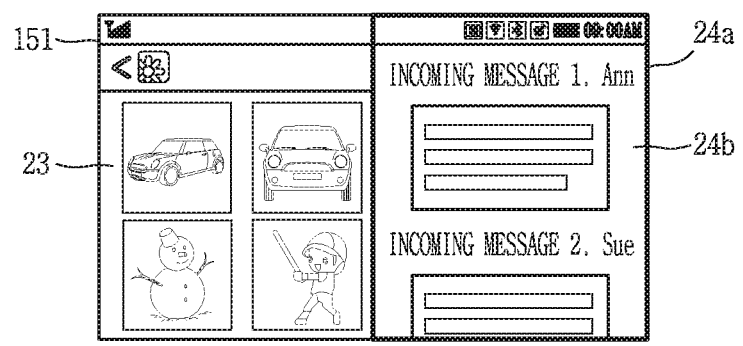
Figure 8B:
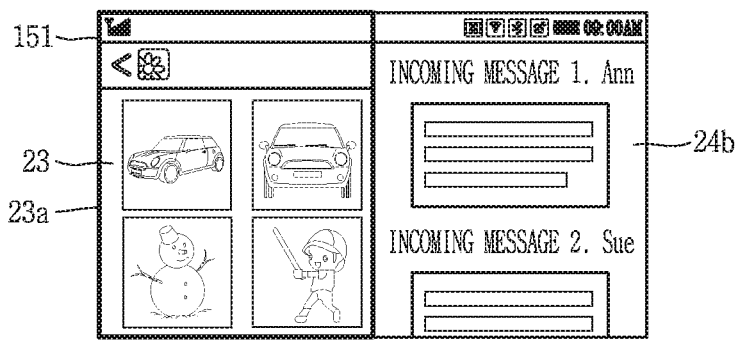

FIGS. 8A and 8B are views illustrating an embodiment related to multitasking of a function corresponding to screen information and a function included in recommendation information.

First, referring to FIG. 8A, alert information may be displayed on the display unit 151 together with screen information 23, and the alert information may include recommendation information 6d for another function different from a function corresponding to the screen information 23.

At this time, when a user's preset gesture is sensed by the sensing unit, the controller 180 may execute the another function included in the recommendation information 6d. At this time, the controller 180 may divide the display unit 151 into a plurality of areas, and, as illustrated in a second diagram of FIG. 8A, control the display unit 151 to output the screen information 23 and an execution screen 24 of the another function in the plurality of areas, respectively.

In this manner, when the execution of the function corresponding to the screen information is maintained together with the execution of the another function, the output of the screen information can be maintained so that the user can simultaneously receive the screen information and the execution screen of the another function.

In addition, in the state where the screen information and the execution screen of the another function are simultaneously output, the controller 180 may control the screen information or the execution screen of the another function based on the user's input or gesture.

The controller 180 may specify a control area to be controlled based on the user's input or gesture among the plurality of areas of the display unit 151. Further, the display unit 151 may be controlled such that the specified control area is distinguishably output. That is, as illustrated in a first diagram of FIG. 8B, the control area to be controlled based on the user's input or gesture may be one area 24a output on the execution screen 24 of the another function.

In this manner, when a user's specific gesture (for example, a gesture of nodding the head) is detected in a state where the control area 24a has been specified, the controller 180 may control the execution screen 24 based on the specific gesture. That is, as illustrated in a second diagram of FIG. 8B, an execution screen 24b may be output on the specified one area 24a based on the specific gesture.

Also, the controller 180 may change the control area, in response to a preset user gesture being applied after the one area 24a is specified. For example, when a user gesture of blinking one eye is detected, the controller 180 may change the one area 23a located at a position corresponding to the blinking eye to the control area.

In this way, when the control area is changed, the controller 180 may output a specific visual effect along a periphery of the changed control area 23a so that the changed control area 23a is distinguishable.

Accordingly, the user can execute another function different from a previously-output function corresponding to screen information, together with the function corresponding to the screen information. In addition, a screen corresponding to each of different functions can be provided using each of the plurality of divided areas of the display unit 151, and only a screen output on one area can selectively be controlled by applying various gestures.

On the other hand, as described above with reference to FIG. 6B, when the main body completely moves out of the moving area while moving at the second speed, the controller 180 may control the display unit 151 to overlap the alert information with the entire screen information.

The controller 180 may control the output state of the display unit 151 based on an additional movement of the main body in the state where the alert information overlaps the entire screen information.

Figure 9A:
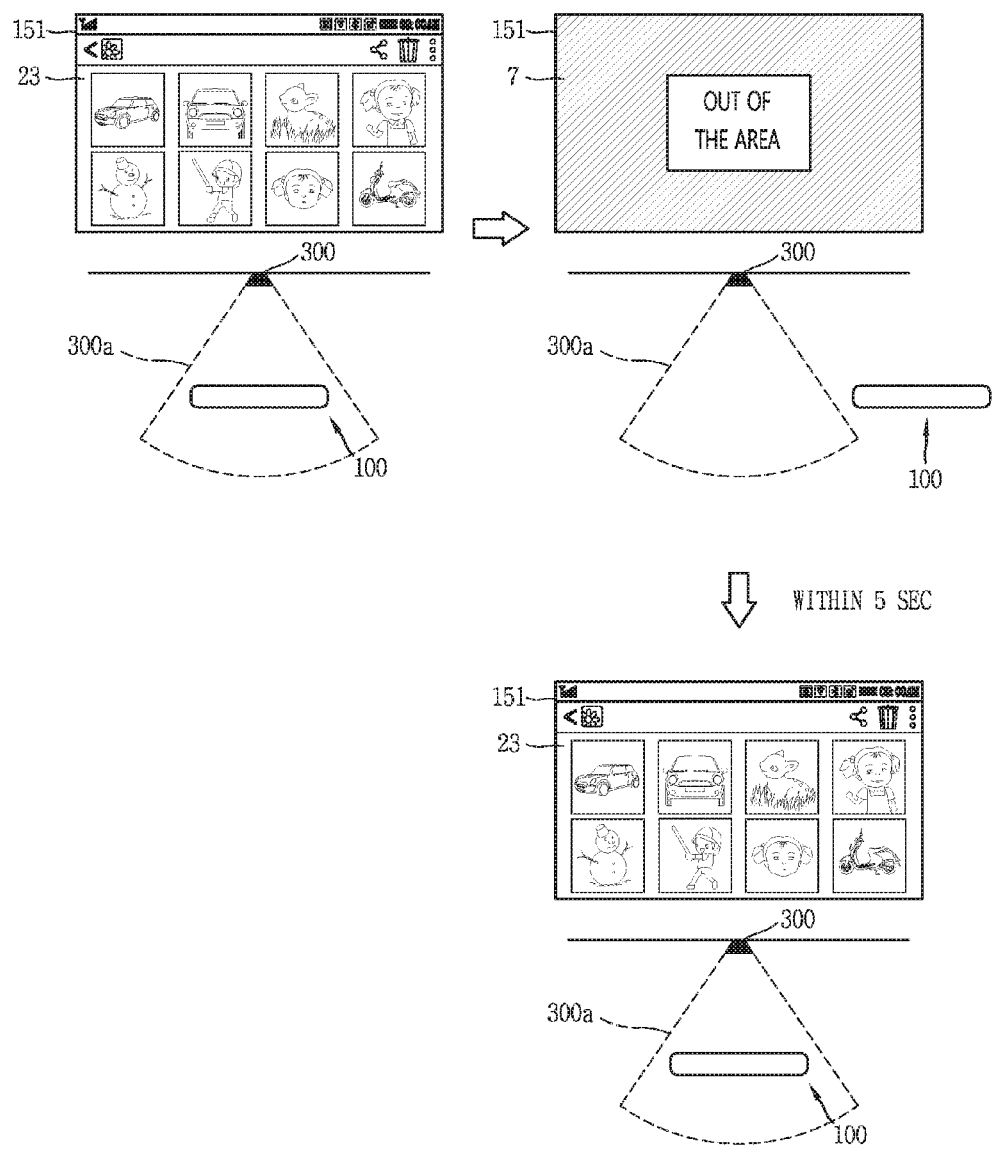
FIGS. 9A and 9B are views illustrating an embodiment in which an output state of a display unit is controlled based on a movement of a main body in a state where alert information overlaps entire screen information.
Figure 9B:
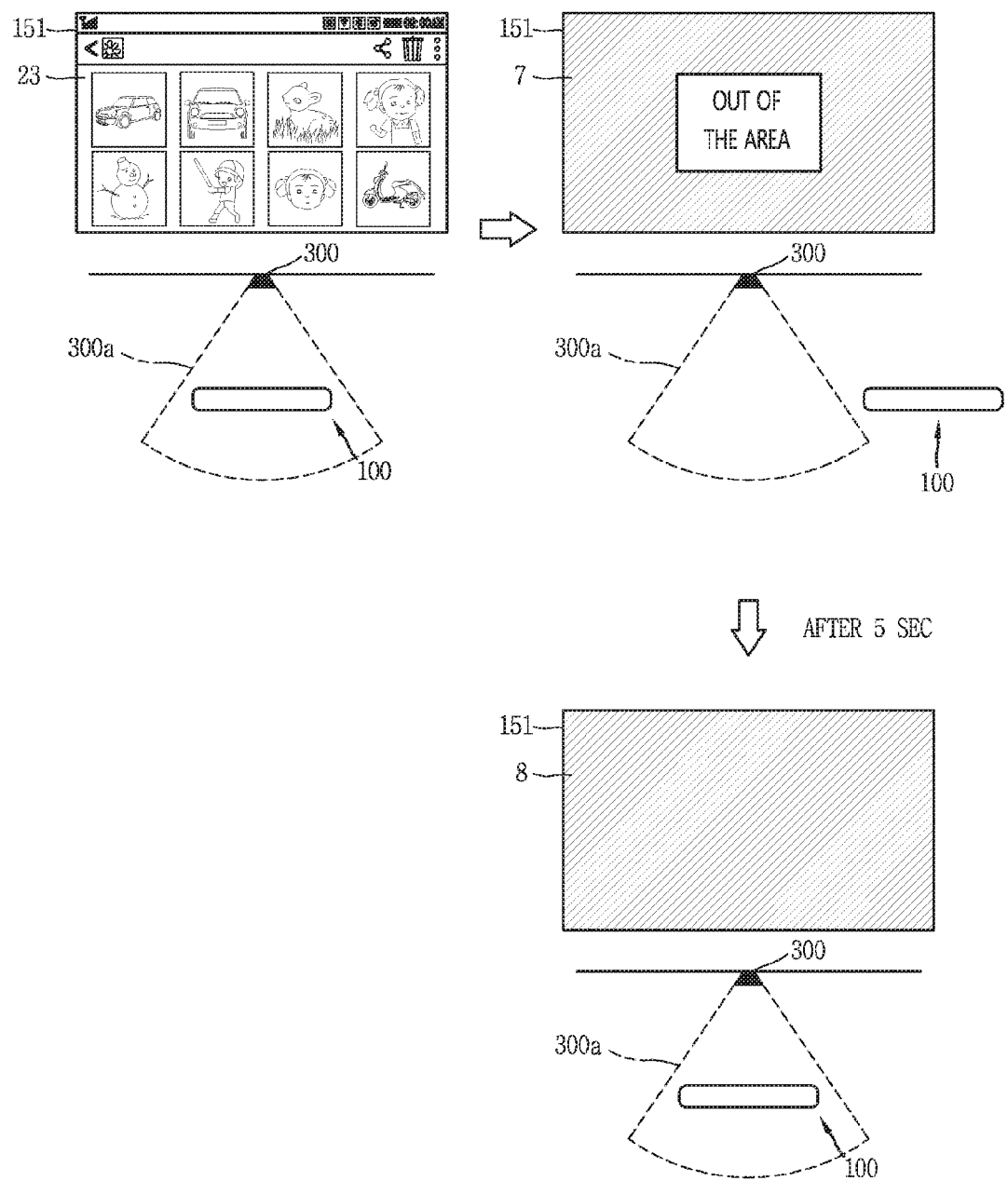

FIGS. 9A and 9B are views illustrating an embodiment of controlling the output state of the display unit based on the movement of the main body in the state where the alert information overlaps the entire screen information.

Referring to FIG. 9A, the controller 180 may determine a moving speed of the main body, based on a degree of change of at least part of the image in the captured image for a preset reference time in a state where the screen information 23 is output on the display unit 151. When the entire image is not detected for the preset reference time (when the degree of change of the at least part of the image is a second degree of change), the controller 180 may determine that the main body is completely out of the moving area of the main body.

For example, when the preset object is the plurality of light emitting elements, the controller 180 may determine the moving speed of the main body based on a degree of change of the number of optical images constituting the optical image pattern, detected in the captured image, for the preset reference time.

When the number of optical images constituting the optical image pattern is reduced by the reference number for the preset time, the controller 180 may determine that the main body has completely moved out of the moving area at the second speed (see FIG. 6B). As illustrated in a second diagram of FIG. 9A, alert information 7 may overlap the entire screen information 23. In addition, the alert information 7 may additionally include information to indicate that the main body is out of the moving area.

When the alert information overlaps the entire screen information, the controller 180 may control the display unit 151 to terminate the output of the screen information.

In addition, the controller 180 may analyze using the captured image whether the main body moves for a preset time from the termination of the output of the screen information. For example, when the number of optical images constituting the optical image pattern is detected as the reference number within the preset time, the controller 180 may determine that the main body is located within the moving area.

In this case, the controller 180, as illustrated in a third diagram of FIG. 9A, may control the display unit 151 to display the screen information 23 again.

Alternatively, the main body may not be located in the moving area within a preset time or may be located in the moving area after a lapse of the preset time, from the termination of the output of the screen information 23.

For example, as illustrated in a second diagram of FIG. 9B, after the alert information 7 is output on the entire area of the display unit 151, the main body may not be located within the moving area while the preset time elapses.

In this case, the controller 180 may terminate the execution of the function corresponding to the screen information at the time when the preset time has elapsed.

That is, although the main body moves completely out of the moving area, when the main body moves back into the moving area within a preset time, the controller 180 may determine that the user intends to continuously control the screen information. Accordingly, the controller 180 may temporarily terminate the output of the screen information, and then output the screen information again on the display unit so that the screen information can be additionally controlled when the main body moves into the moving area again.

On the other hand, when the main body is not located within the moving area even after the lapse of the preset time in the state where the main body is completely out of the moving area, the user may not intend to continuously control the screen information. Therefore, in this case, the controller 180 may terminate the executed function corresponding to the screen information, thereby saving power.

Meanwhile, an output position of the alert information on the display unit 151 may vary according to a direction in which the main body moves out of the moving area. More specifically, when a specific part of the image of the preset object included in the captured image is not detected, the controller 180 may determine a position of the specific part of the image. Also, the controller 180 may control the display unit 151 to display the alert information at a position on the display unit, which corresponds to the position of the specific part of the image. Hereinafter, this will be described with reference to FIG. 10.

Figure 10:
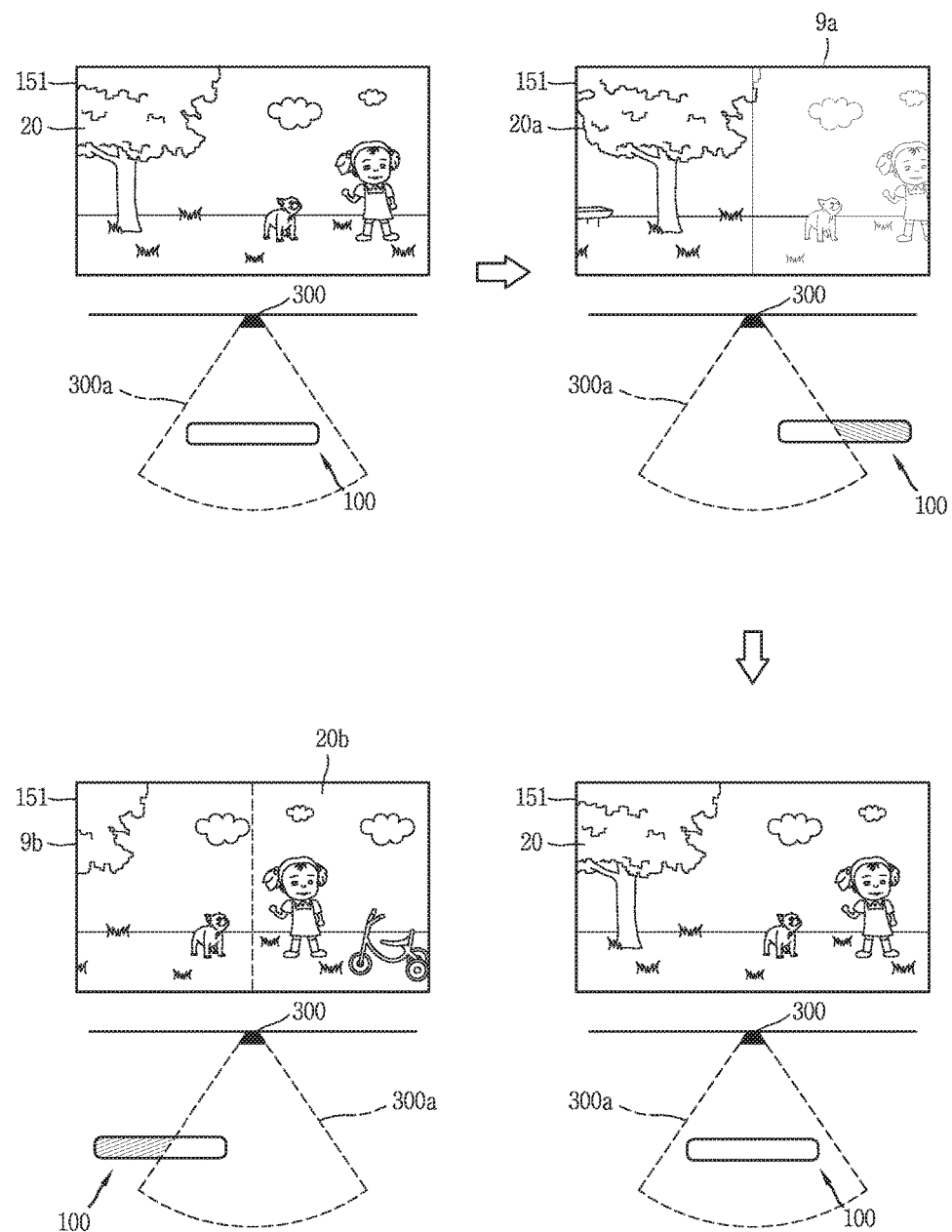
FIG. 10 is a view illustrating an embodiment in which an output position of alert information is changed based on a direction in which the main body moves out of a moving area.

FIG. 10 is a view illustrating an embodiment in which an output position of alert information is changed based on a direction in which the main body moves out of a moving area.

Referring to a first diagram of FIG. 10, screen information 20 is output on the display unit 151 and the main body of the HMD 100 is located within a preset viewing angle range 300a of the external camera 300. At this time, as the main body is rotated clockwise, a part of the main body may deviate from the preset viewing angle range 300a.

When the preset object is a plurality of light emitting elements, the controller 180 controls the display unit 151 5o output changed screen information 20a based on a number of optical images constituting an optical image pattern, detected in a captured image obtained from the external camera 300.

Also, the controller 180 may analyze the captured image to specify one area where the optical image is not detected in the optical image pattern. An output position of the alert information may be determined based on the specified one area of the optical image pattern. That is, referring to a second diagram of FIG. 10, the controller 180 may control the display unit 151 to display the alert information 9a at a position, which corresponds to the specified one area of the optical image pattern on the display unit 151.

When the main body moves back into the preset viewing angle area 300a of the external camera 300 while the alert information 9a is output, as illustrated in FIG. 10, the controller 180 may control the display unit 151 to output the screen information 20. In addition, when the main body is located in the preset viewing angle range 300a, the output of the alert information 9a may be terminated.

When a part of the main body is out of the viewing angle range 300a due to a counterclockwise rotation of the main body, the controller 180 may specify another area, in which the optical image is not detected in the optical image pattern. Also, as illustrated in a fourth diagram of FIG. 10, the controller 180 may control the display unit 151 to output the alert information 9b at a position, which corresponds to the another one area of the optical image pattern on the display unit 151.

Therefore, the user can easily recognize a direction in which the main body deviates from the moving area of the main body, based on the output position of the alert information on the display unit.

On the other hand, the plurality of light emitting elements mounted on the main body of the HMD may be obscured by another subject. For example, when the user wearing the HMD touches the main body of the HMD, at least part of the plurality of light emitting elements may be obscured by the user's hand. In this case, the controller 180 may inform the user that the at least part of the plurality of light emitting elements is obscured by the user's hand. That is, when a movement of the specific object with respect to the main body is detected in the captured image obtained by an external camera, the controller 180 may provide the user with notification information related to presence of the specific subject.

Figure 11:
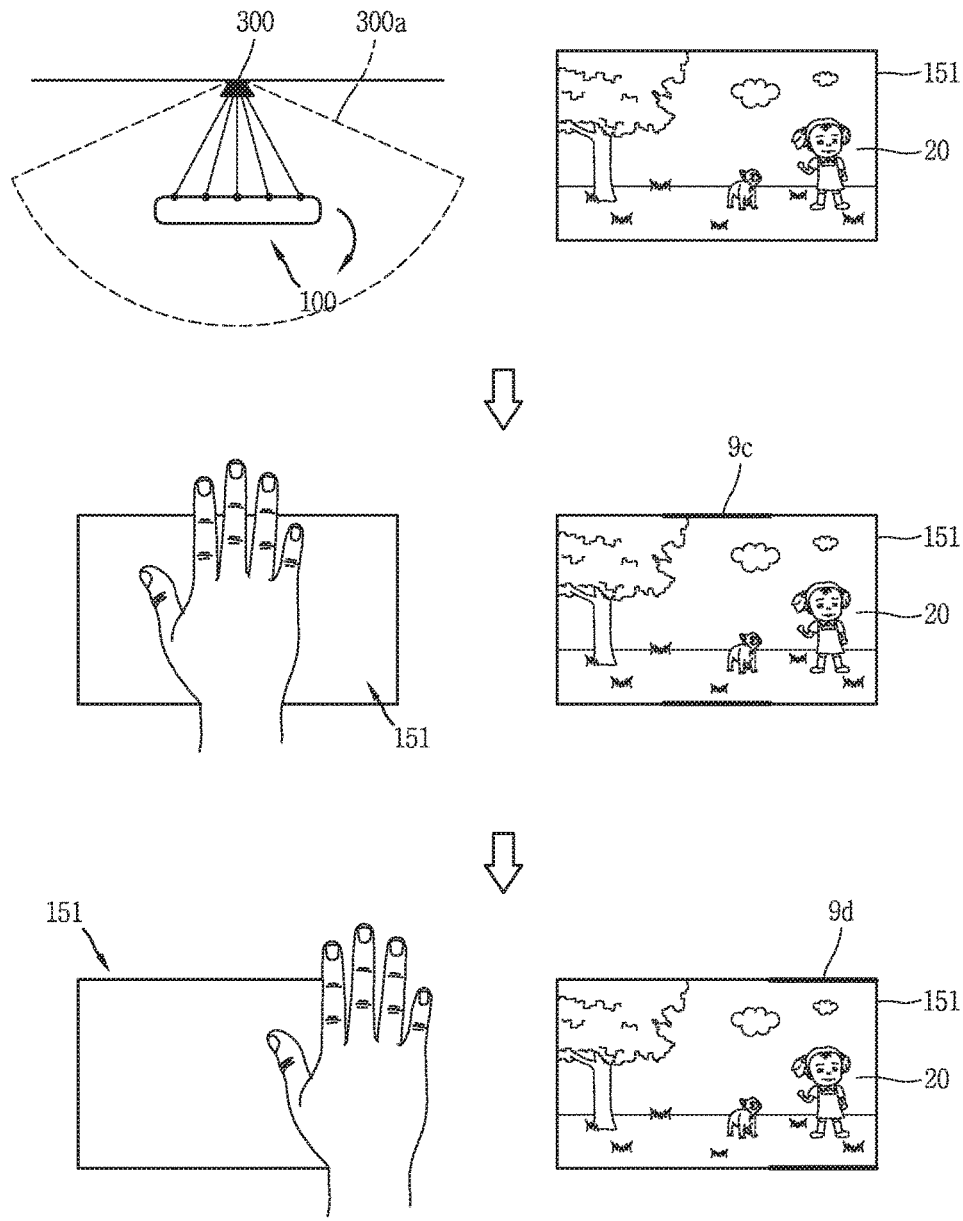
FIG. 11 is a view illustrating an embodiment of outputting information informing a movement of a specific subject (object) with respect to a main body.

FIG. 11 is a view illustrating an embodiment of outputting information informing a movement of a specific subject (object) with respect to the main body.

As illustrated in a first diagram of FIG. 11, in a state where screen information 20 is output on the display unit 151, at least part of the main body may be obscured by a specific subject (e.g., a user's hand), as illustrated in a second diagram of FIG. 11. When the at least part of the main body is obscured, the controller 180 may recognize the presence of the specific subject with respect to the main body using the captured image.

More specifically, when the specific subject moves with respect to the main body, capturing of at least part of the plurality of light emitting elements by the external camera 300 may be restricted. In this case, a detection of at least part of the optical images constituting the optical image pattern from the captured image may be restricted.

The controller 180 may recognize the detection-restricted at least part of the optical images constituting the optical image pattern, by using the captured image. The controller 180 may recognize a position of the at least part of the light emitting elements, which corresponds to the at least part of the optical images, among the plurality of light emitting elements mounted on the main body. The controller 180 may control the display unit 151 to output notification information indicating the movement of the specific subject to a position corresponding to the position of the at least part of the light emitting elements.

That is, as illustrated in the second diagram of FIG. 11, the controller 180 may recognize a position of a part of the light emitting elements, which is obscured by the user's hand, among the plurality of light emitting elements, and output notification information 9c to a position on the display unit 151 corresponding to the position of the part of the light emitting elements.

Also, as illustrated in a third diagram of FIG. 11, when an obscured area of the main body is changed due to the movement of the specific subject with respect to the main body, the controller 180 may change the output position of notification information 9d to a position corresponding to the changed area.

Therefore, the notification information can be provided even though the user unintentionally obscures at least part of the plurality of light emitting elements, which may allow the user to recognize the obscured area.

According to the present invention, a movement of a main body of an HMD can be recognized by using a captured image with respect to a preset object, thereby accurately detecting various movements of the main body, and controlling various functions using the detected movements.

In addition, alert information can be output when capturing of at least part of the preset object is failed due to the movement of the main body, which may allow the user to recognize a moved state of the main body.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the HMD. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A head mounted display (HMD), comprising:
    a main body formed to be wearable on a head portion of a user;
    a camera mounted on the main body;
    a display unit mounted on one area of the main body and configured to output screen information;
    a plurality of sensors to detect an object disposed outside the HMD; and
    a controller configured to:
        detect the sensors detecting the object;
        control the display unit to change the screen information based on a number of images obtained by the sensors in a moving area in which the main body is allowed to control the screen information;
        change a part of the screen information to display alert information according to a moving speed of the main body determined based on a degree that the main body is out of the moving area;
        acquire captured images including an image of the object from the camera; and
        control the display unit to change an output of the alert information based on a moving speed of the main body determined from the captured images.

2. The HMD of claim 1, wherein the object is a plurality of light emitting elements each emitting preset light.

3. The HMD of claim 1, wherein the controller determines the moving speed of the main body using a degree of change of at least part of the image of the object for a preset reference time when the at least part of the image of the object is not detected in the captured images.

4. The HMD of claim 3, wherein the controller controls the display unit such that the alert information overlaps the part of the screen information when the degree of change of the at least part of the image of the object is a first degree of change, and
    controls the display unit such that the alert information overlaps the entire screen information when the degree of change of the at least part of the image of the object is a second degree of change.

5. The HMD of claim 4, wherein, when the degree of change of the at least part of the image of the object is the second degree of change, the controller controls the display unit such that the alert information includes information indicating that the main body is out of the moving area of the main body.

6. The HMD of claim 1, wherein, when a specific part of an image of the object is not detected in the captured images, the controller controls the display unit such that the alert information is output at a position, which corresponds to a position of the specific part with respect to the image of the object.

7. The HMD of claim 1, wherein, when a movement of a specific subject with respect to the main body is detected from the captured images and at least part of the image of the object is not detected based on the movement of the specific subject, the controller controls the display unit such that the alert information includes notification information indicating presence of the specific subject.

8. The HMD of claim 1, wherein the controller is configured to change the part of the screen information to a blur screen, mosaic screen, or un-focused screen, or such that a brightness variation, contrast variation, or transition effect variation is applied to the part of the screen information to be distinguished from a normal screen part of the screen information.

9. A method for controlling a head mounted display (HMD), the method comprising:
    displaying screen information on a display unit mounted on one area of a main body of the HMD formed to be wearable on a head portion of a user;
    detecting sensors tracking an object disposed outside the HMD;
    changing the screen information based on a number of images obtained by the sensors in a moving area in which the main body is allowed to control the screen information;
    changing a part of the screen information to display alert information according to a moving speed of the main body determined based on a degree that the main body is out of the moving area;
    acquiring captured images including an image of the object from a camera mounted on the main body; and
    changing an output of the alert information based on a moving speed of the main body determined from the captured images.

10. The method of claim 9, wherein the alert information is differently displayed based on a degree of change of at least part of the image of the object for a preset reference time when the at least part of the image of the object is not detected in the captured images.

* * * * *